United States Patent
Ta et al.

(10) Patent No.: US 8,285,451 B2
(45) Date of Patent: Oct. 9, 2012

(54) METHOD AND APPARATUS FOR CONTROLLING ELECTRIC POWER STEERING SYSTEM

(75) Inventors: CaoMinh Ta, Maebashi (JP); ChunHao Jiang, Maebashi (JP); Hideyuki Kobayashi, Maebashi (JP)

(73) Assignee: NSK Ltd., Tokyo (JP)

( * ) Notice: Subject to any disclaimer, the term of this patent is extended or adjusted under 35 U.S.C. 154(b) by 1143 days.

(21) Appl. No.: 11/908,887

(22) PCT Filed: Mar. 17, 2006

(86) PCT No.: PCT/JP2006/305887
§ 371 (c)(1), (2), (4) Date: Sep. 17, 2007

(87) PCT Pub. No.: WO2006/098516
PCT Pub. Date: Sep. 21, 2006

(65) Prior Publication Data
US 2009/0234538 A1    Sep. 17, 2009

(30) Foreign Application Priority Data
Mar. 17, 2005 (JP) ................................. 2005-076537

(51) Int. Cl.
G06F 17/00 (2006.01)
B62D 6/00 (2006.01)
B62D 6/08 (2006.01)
B62D 5/04 (2006.01)
H02P 31/00 (2006.01)
H02P 7/06 (2006.01)

(52) U.S. Cl. ............ 701/41; 701/43; 180/446; 318/139; 318/432; 318/434

(58) Field of Classification Search .................... 701/36, 701/41, 42, 43; 180/443, 446; 318/139, 318/432, 434, 430, 443, 445
See application file for complete search history.

(56) References Cited

U.S. PATENT DOCUMENTS

| 5,299,648 A | 4/1994 | Watanabe et al. |
| 5,361,210 A * | 11/1994 | Fu .................................. 701/41 |
| 5,602,735 A * | 2/1997 | Wada .............................. 701/41 |
| 5,656,911 A | 8/1997 | Nakayama et al. |

(Continued)

FOREIGN PATENT DOCUMENTS
DE        10216104 A1    11/2003
(Continued)

OTHER PUBLICATIONS

Communication and Supplementary European Search Report dated May 12, 2011 in counterpart European Patent Application No. 06 72 9835.

(Continued)

Primary Examiner — Thomas Tarcza
Assistant Examiner — Edward Pipala
(74) Attorney, Agent, or Firm — Sughrue Mion, PLLC

(57) ABSTRACT

Disclosed herein is a method for controlling an electric power steering system, wherein a motor is controlled by vector control and driven by a current command value calculated on the basis of a parameter such as a steering torque to provide a steering assist power to a vehicle steering system, and further wherein the current command value is limited on the basis of desired output characteristics and a desired angular speed during a field-weakening control and a non-field-weakening control of the vector control.

12 Claims, 14 Drawing Sheets

U.S. PATENT DOCUMENTS

| | | | |
|---|---|---|---|
| 5,758,741 A * | 6/1998 | Tomioka | 180/446 |
| 6,013,994 A * | 1/2000 | Endo et al. | 318/432 |
| 6,184,637 B1 * | 2/2001 | Yamawaki et al. | 318/432 |
| 2002/0125064 A1 * | 9/2002 | Mori et al. | 180/444 |
| 2002/0166716 A1 * | 11/2002 | Shimizu et al. | 180/446 |
| 2004/0217729 A1 | 11/2004 | Recker | |
| 2006/0001392 A1 * | 1/2006 | Ajima et al. | 318/432 |
| 2007/0158132 A1 * | 7/2007 | Ta et al. | 180/446 |

FOREIGN PATENT DOCUMENTS

| | | |
|---|---|---|
| EP | 0638457 A2 | 2/1995 |
| EP | 1662650 A1 | 5/2006 |
| FR | 2825853 A1 | 12/2002 |
| JP | 60197183 A | 10/1985 |
| JP | 07170800 A | 7/1995 |
| JP | 08009699 A | 1/1996 |
| JP | 8-108858 A | 4/1996 |
| JP | 8-142886 A | 6/1996 |
| JP | 2001-18822 A | 1/2001 |
| JP | 2003-79181 A | 3/2003 |
| JP | 2004-40883 A | 2/2004 |
| JP | 2004201487 A | 7/2004 |
| JP | 2005-7991 A | 1/2005 |

OTHER PUBLICATIONS

Japanese Office Action dated Nov. 11, 2011, issued in counterpart Japanese Patent Application No. 2007-508261.

* cited by examiner

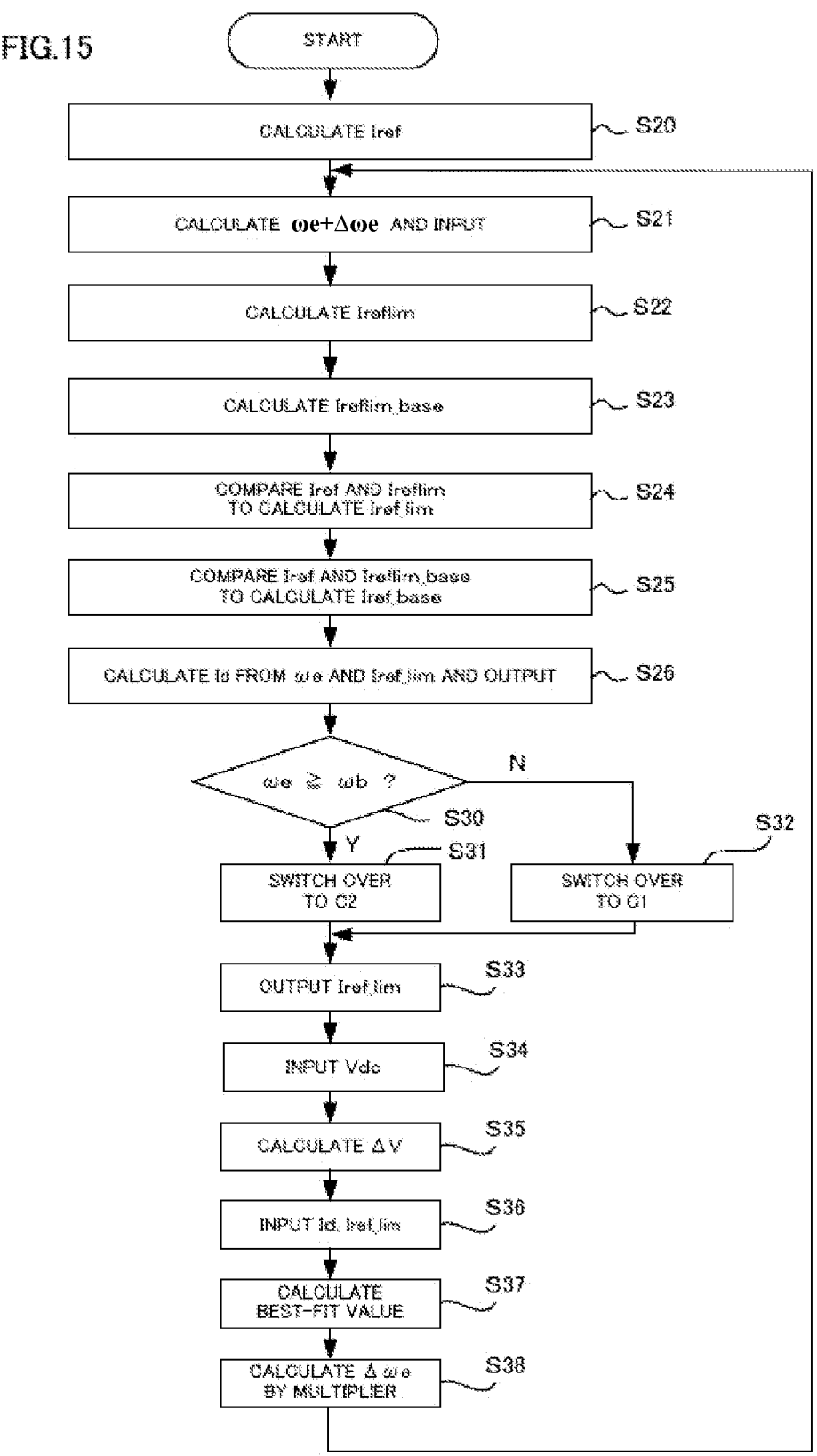

METHOD AND APPARATUS FOR CONTROLLING ELECTRIC POWER STEERING SYSTEM

TECHNICAL FIELD

The present invention relates to a method and apparatus for controlling an electric power steering system for use with a permanent magnet type brushless DC-motor, and in particular to a method and apparatus for controlling an electric power steering system in which a motor torque ripple which causes abnormal noise from a steering wheel during an abrupt steering wheel operation is reduced by limiting a current command value at a field-weakening control time of a d-axis current in a vector control and thereby setting a d-axis current as low as possible within a range meeting the requirement specifications.

BACKGROUND ART

Electric power steering apparatuses using motor torque to provide a power assist to steering are widely used in automobiles so as to allow a light steering operation. Such an electric power steering system includes a geared or belted transmission mechanism transmitting the driving force of a motor through a reducer to provide the power assist to a steering shaft or a rack shaft.

FIG. 1 shows a typical structure of such an electric power steering system. A column shaft 302 of a steering wheel 301 is connected to tie rods 306 of the steering control wheels via reduction gears 303, universal joints 304a and 304b and a pinion-rack mechanism 305. The column shaft 302 is provided with a torque sensor 307 for detecting the steering torque of the steering wheel 301. A motor 308 assisting the steering force of the steering wheel 301 is connected to the column shaft 302 via the reduction gears 303.

In the electric power steering system having such a structure, the torque sensor 307 detects a steering torque generated by a driver's operating force on the steering transmitted from the steering wheel 301, and the motor 308 is driven and controlled by a current command value calculated based on a torque signal and a vehicle speed signal. This drive provides the power assist to the driver's operation of the steering wheel 1 and thereby gives the driver a light steering operation. In other words, the steering feel of the steering wheel as well as the performance of the electric power steering system significantly depend on: the current command value determined on the basis of the steering torque produced by a steering wheel operation; and the method of controlling the motor 308 based on the current command value.

Before describing the problems that must be overcome to achieve preferred embodiments of the motor control for the electric power steering system from the foregoing perspective, a description will first be given of the general motor characteristics of motors used for the electric power steering systems, and the motor torque control method.

First, the motor characteristics will now be described. The normal operating range of a motor can be defined by a torque-speed characteristic (T-n characteristic) derived from a motor output equation. The motor output equation for a three-phase brushless DC-motor (BLDC motor) can be expressed by the following Formula 1:

$$v = EMF + R \cdot i + L \cdot di/dt \quad \text{(Formula 1)}$$

where "v" is the phase voltage of the motor, "i" the phase current of the motor, "EMF" the phase back EMF voltage, "R" the per-phase resistance, and "L" the per-phase inductance.

Assuming here that saturation (i.e., PWM duty=100%) is reached, a motor-driving battery voltage Vbat will be applied to the two windings of the motor. Therefore, the above Formula 1 can be transformed into Formula 2 below:

$$Vbat = EMF_{LL} + 2R \cdot I \quad \text{(Formula 2)}$$

where "$EMF_{LL}$" is the back EMF voltage measured between two phases, and "I" is the motor current.

Next, using Formula 3, which is an equation for the back EMF voltage EMF, and Formula 4, which is a torque equation, the following Formula 5 can be derived from Formula 2 above:

$$EMF_{LL} = Ke \cdot \omega \quad \text{(Formula 3)}$$

where "Ke" is the back EMF constant and "$\omega$" is the angular speed (rotational speed).

$$T = Kt \cdot I \quad \text{(Formula 4)}$$

where "Kt" is the torque constant.

$$\omega = \omega_0(1-(I/I_0)) = \omega_0(1-(T/T_0)) \text{ [rad/s]} \quad \text{(Formula 5)}$$

where "$\omega_0$=Vbat/Ke" is the no-load angular speed (one under no-torque condition), "$I_0$=Vbat/2R" the locked rotor current (i.e., stall current) (angular speed=0), and "$T_0 = Kt \cdot I_0$" the locked rotor torque (i.e., stall torque).

A "rad/s" to "rpm" conversion of the foregoing Formula 5 yields the following Formula 6:

$$n = n_0(1-(I/I_0)) = n(1-(T/T_0)) \text{ [rpm]} \quad \text{(Formula 6)}$$

The foregoing Formula 6 expresses a linear torque-speed characteristic (T-n characteristic).

Here, the actual torque-speed characteristic (T-n characteristic) of a brushless DC-motor slightly differs from Formula 6 and can be given by the following Formula 7:

$$n = n_0 - (n_0 - n_{rated}) \cdot T/T_{rated} \quad \text{(Formula 7)}$$

where "$n_0$" is the no-load rotational speed, "$n_{rated}$" the rated rotational speed, and "$T_{rated}$" the rated torque.

The above Formulas 6 and 7 can be graphically represented as shown in FIG. 2, where point "A" represents the rated value and point "B" the no-load value. The broken line given by Formula 6 is an ideal straight line, while the actual characteristic given by Formula 7 (solid curve) differs slightly from such an identical straight line. This difference is attributable to the influence of the inductance value L of the motor. The higher the applied current is, the more the actual characteristic line deviates from the ideal straight line.

The T-n characteristic in FIG. 2 represents the performance limit of the motor. Within the range below the T-n characteristic curve in FIG. 2, the motor starts from a stopped condition and runs up to the maximum angular speed to produce the maximum torque possible without exceeding thermal and electrical limits.

In FIG. 3, a characteristic line 1 represents the T-n characteristic of a low-power motor, while a characteristic line 3 represents the T-n characteristic of a high-power motor. If a characteristic curve 2 represents a motor load characteristic of the electric power steering system, a high-power motor the exhibiting characteristic 3 would cover the entire range of the load characteristic represented by the characteristic curve 2. However, use of such a motor would involve a problem of increasing cost and size. An attempt to use a low-power motor exhibiting the characteristic 1 to cover the load characteristic represented by the characteristic curve 2 would, however, leave the high-speed rotation range of the characteristic 2 uncovered. As a method for covering the load characteristic represented by the characteristic curve 2 with a motor exhibiting the characteristic 1, a field-weakening control of a motor vector control can be used to convert the T-n characteristic of the motor exhibiting the characteristic 1 into the T-n characteristic represented by the characteristic curve 4.

There are well-known conventional methods for controlling a motor in an electric power steering system by the vector control with the field-weakening control taken into consideration. For example, Japanese Patent Application Laid-open No. 2001-18822 A discloses a method for controlling a motor in an electric power steering system by a vector control.

FIG. 4 shows a basic block diagram of the electric power steering system using the vector control method disclosed in Japanese Patent Application Laid-open No. 2001-18822 A.

A current command determination means 324 determines d-axis and q-axis current command values idref and iqref based on a torque command value Tref. Meanwhile, current detection means 341 and 342 detect motor currents ia, ib and ic of a motor 308, which are converted, by a three phase-to-two phase conversion means 343, into two axis (d-q axis) currents id and iq. Subtractors 325 and 326 respectively calculate current deviations between the d-axis current command value idref and a feedback current value id and a current deviation between the q-axis current command value iqref and another feedback current value iq. The current deviations are inputted to a PI-control means 328, which in turn determines voltage command values vd and vq for reducing the current deviations to zero. The motor 308 is a three-phase motor, and the voltage command values vd and vq are converted by a two phase-to-three phase conversion means 336 into three phase voltage command values va, vb and vc.

A PWM-control means 337 generates PWM-controlled gate signals based on the three-phase voltage command values va, vb and vc. An inverter 338 is driven by the gate signals generated by the PWM-control means 337 to supply the motor 308 with currents that reduce the current deviations to zero. A resolver 316 detects and feeds the angle (rotational position) θ of the motor 308 to an angular speed conversion means 348 to determine an angular speed (rotational speed) ω used for the vector control.

In such vector control, the field-weakening control is used in the high-speed range of the motor 308.

Here, the motor 308 is controlled by the vector control on the basis of a steering assist current command value Iref determined on the basis of steering torque (or vehicle speed and so on) detected by the torque sensor 307. This vector control is given either by the following Formula 8, if no field-weakening control is performed (Id=0), or the following Formula 9, if the field-weakening control is performed (Id≠0).

Iq=Iref

Id=0 (Formula 8)

Iq=Iref

Id≠0 (Formula 9)

Meanwhile, a motor current Is is given in terms of a d-axis current command value Id and a q-axis current command value Iq by Formula 10 below:

$Is=\sqrt{(Iq^2+Id^2)}$ (Formula 10)

An abrupt turning-returning operation of the steering wheel that provides the vector control over a motor having such a current relationship as a condition will cause the motor to fail to produce the necessary torque. Consequently, the motor will remain in a range with the field-weakening control. In other words, a PWM-duty saturation (duty=100%) may occur in the high-speed rotation range.

The PWM-duty saturation results in a current waveform distortion, causing a large torque ripple in the motor, as a result of which, steering wheel vibration or abnormal motor noise is caused.

Such an attempt to perform the control beyond the limit of a rated torque output will result in the PWM-duty saturation and consequently a large torque ripple, causing the driver to experience steering wheel vibration or an unnatural steering feel.

To deal with such defective conditions, control methods have been proposed including one according to Japanese Patent Application Laid-open No. 08-142886 A. FIG. 5 shows a control block diagram disclosed in Japanese Patent Application Laid-open No. 08-142886 A.

When a motor driving signal $S_M$ calculated on the basis of a motor current command value $S_I$ calculated by a current command calculator 2018 is between an upper limit value $S_{MAX}$ and a lower limit value $-S_{MAX}$, the motor 308 will be PWM-controlled according to the calculated motor driving signal $S_M$. However, when the motor driving signal $S_M$ calculated on the basis of the motor current command value $S_I$ is equal to or over the upper limit value $S_{MAX}$ or is equal to or below the lower limit value $-S_{MAX}$, the motor driving signal $S_M$ will be replaced with the upper limit value $S_{MAX}$ or the lower limit value $-S_{MAX}$ so that the output value will be limited by a limiter 2110.

Thus, in the apparatus according to Japanese Patent Application Laid-open No. 08-142886 A, the PWM-duty is forcibly limited to prevent the PWM-duty saturation.

However, in the apparatus according to Japanese Patent Application Laid-open No. 08-142886 A, an output value to a PWM-circuit 2029 is limited by the limiter 2110, and hence the driver will still be left with an unnatural steering feel.

Then, there are three concepts to be understood with regard to the field-weakening control for the permanent magnet type brushless DC-motors. These concepts are a constant power control with a constant voltage, a constant power control with a constant current and a constant voltage control with a constant current. The first two concepts are relatively simple, but the constant power conditions cannot be maintained over a wide range of speed. The third concept takes the limit conditions into consideration and hence is more accurate. However, motor resistance is often ignored, resulting in significant calculation errors with, in particular, small motors. The motor resistance is relatively high with respect to inductance. That is, the influence of not only the motor resistance but also the inductance must be taken into consideration.

In the electric power steering system, the steering assist torque is a function of steering torque. When the steering wheel is turned back very quickly, a required steering assist torque will be too large for the motor to follow immediately. Therefore, the motor cannot provide an accurate steering assist torque. This means that a motor current limiting system such as the one described above (involving the limited motor power and the duty saturation) cannot provide a motor current corresponding to the current command value (reference current) directly proportional to the required torque. In this condition, a torque ripple occurs resulting in an unnatural steering feel or abnormal noise.

The present invention has been made in view of the aforementioned circumstances. An object of the present invention is to provide a method and apparatus for controlling an electric power steering system in which a current command value is limited to set a d-axis current as low as possible within a range meeting the requirement specifications at a time of a d-axis field-weakening control of a vector control so that a torque ripple in a high-speed range of the motor during an abrupt turning-returning operation of the steering wheel can be reduced, thereby preventing steering wheel vibration and an uncomfortable steering feel. This is because there is a problem of excessive noise caused by such factors as torque ripple due to overuse of the field-weakening control beyond the performance limits of the motor.

Further, an object of the present invention is to provide a method for limiting a reference current that minimizes a torque ripple during a motor operation, and to calculate a d-axis current in the field-weakening control range based on the concepts of using an inverter and maximum functionalization to expand the operating range of the motor in order to provide a method and apparatus for controlling the electric power steering system having a very small torque ripple and a natural steering feel.

DISCLOSURE OF THE INVENTION

The present invention relates to a method for controlling an electric power steering system in which a motor is controlled by a vector control and driven by a current command value calculated on the basis of a parameter such as steering torque to provide steering assist power to a vehicle steering system. The foregoing objects of the present invention can be achieved by limiting the current command value based on a desired output characteristic and angular speed during a field-weakening control and a non-field-weakening control of the vector control.

The foregoing objects of the present invention can be achieved more effectively with look-up tables storing values calculated to limit the current command value, or by the use of battery voltage to limit the current command value.

The present invention relates also to a method for controlling an electric power steering system in which a motor is controlled by a vector control for controlling a motor current through conversion of a current command value calculated on the basis of steering torque and vehicle speed into a torque component current (q-axis current) and a flux control component current (d-axis current) to provide a steering assist power to a vehicle steering system. The foregoing objects of the present invention can be achieved by calculating a d-axis current command value in a field-weakening control range of the vector control based on a rated output characteristic and angular speed of the motor to limit the current command value, and by determining an amount of change in the d-axis current command value and an amount of change in a battery voltage to correct the angular speed with these change amounts.

Moreover, the present invention relates to an apparatus for an electric power steering system that includes a steering assist current command value calculator calculating a steering assist current command value based on a parameter such as steering torque, and a drive controller controlling a drive of a motor by a vector control of the steering assist current command value to provide a steering assist power by means of the motor to a vehicle steering system. The foregoing objects of the present invention can be achieved by providing a current command value calculator that limits the steering assist current command value based on a rated output characteristic of the motor, the current command value, and an angular speed of the motor, so that the current command value calculator outputs a limit value of the current command value and a d-axis current command value during a field-weakening control and a non-field-weakening control of the vector control.

The foregoing objects of the present invention can be achieved more effectively by the current command value calculator comprising a first look-up table outputting a first limit value based on the angular speed, a second look-up table outputting a base limit value based on the angular speed, a first comparator comparing the steering assist current command value with the first limit value to output the limit value, a second comparator comparing the steering assist current command value with the base limit value to output a base command value, a third look-up table receiving the angular speed and the limit values to output the d-axis current command value, a switch switchably outputting the limit value and the base limit value, and a sensing and switching unit detecting the angular speed to switch the switch.

The present invention relates to an apparatus for an electric power steering system that includes a steering assist current command value calculator calculating a steering assist current command value based on a parameter such as steering torque, and a drive controller controlling the drive provided by a motor by the vector control of the steering assist current command value to provide the steering assist power by means of the motor to the vehicle steering system. The foregoing objects of the present invention can be achieved by providing a current command value calculator that limits the steering assist current command value based on a rated output characteristic of the motor, the current command value, an angular speed of the motor, and a battery voltage, a fit-change-to-battery-voltage unit that receives a d-axis current command value and a limit value of the current command value from the current command value calculator and inputs a battery voltage to determine an amount of change in the angular speed, and an adder that inputs the value of the sum of the angular speed of the motor and the amount of change in the angular speed to the current command value calculator, so that the current command value calculator outputs the limit value of the current command value and the d-axis current command value during the field-weakening control and the non-field-weakening control of the vector control.

The foregoing objects of the present invention can be achieved more effectively by the current command value calculator that includes a first look-up table outputting a first limit value based on the value of the sum, a second look-up table outputting a base limit value based on the value of the sum, a first comparator comparing the steering assist current command value with the first limit value to output the limit value, a second comparator comparing the steering assist current command value with the base limit value to output a base command value, a third look-up table receiving the value of the sum and the limit value to output the d-axis current command value, a switch switchably outputting the limit value and the base limit value, and a sensing and switching unit detecting the magnitude of the value of the sum to switch the switch. Alternatively, the above-mentioned objects of the present invention can be achieved effectively either by a fit-change-to-battery-voltage unit that includes a fourth lookup table receiving the d-axis current command value and the limit value of the current command value to output a best-fit value, and a multiplier multiplying the battery voltage and the best-fit value, so that the multiplier outputs an amount of change in an angular speed, or by adopting a permanent magnet type brushless DC-motor as the motor.

BRIEF DESCRIPTION OF THE DRAWINGS

FIG. 15 is a flow chart showing a typical sequence of operational steps in accordance with another preferred embodiment of the present invention.

BEST MODE FOR CARRYING OUT THE INVENTION

First, the principle for calculating a limit value Ireflim of a current command value for limiting a steering assist current command value Iref will be described.

Figure 1:
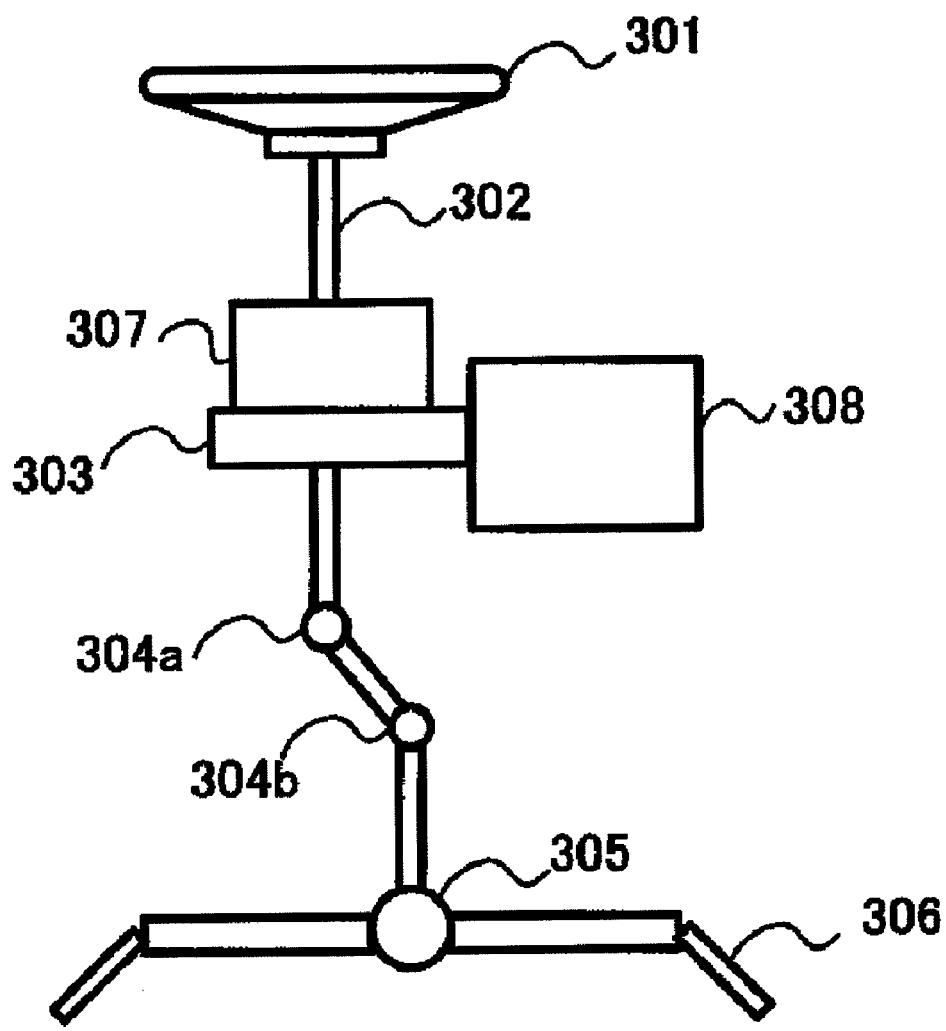
FIG. 1 is a structural diagram of a typical electric power steering system.
Figure 2:
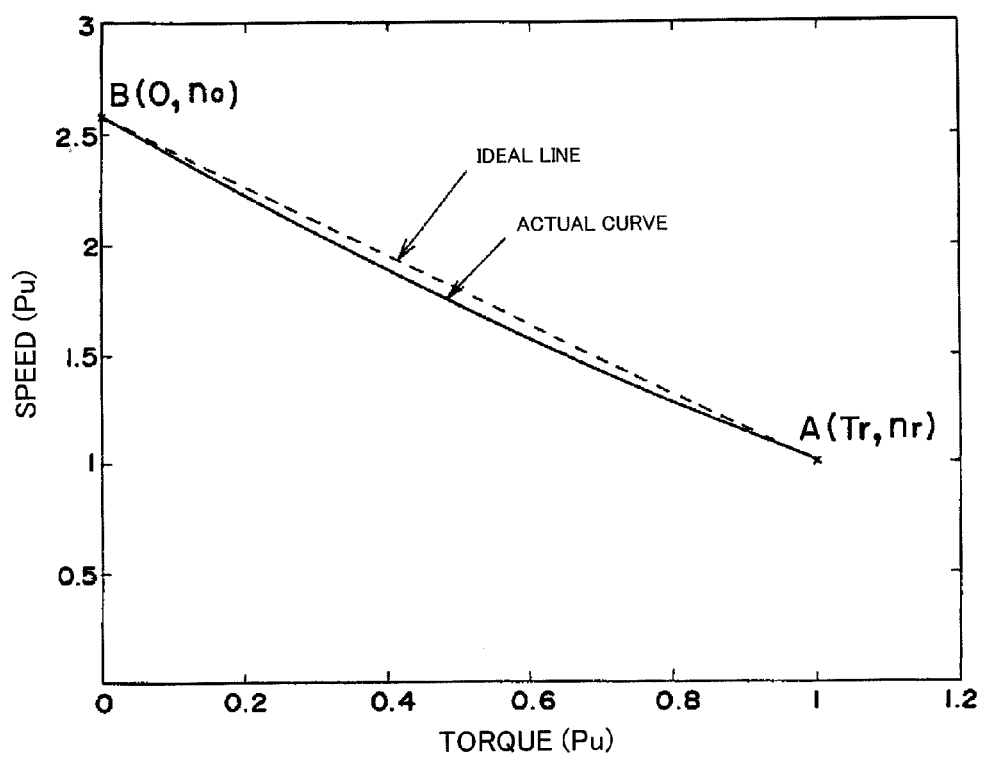
FIG. 2 is a graph showing a T-n characteristic of a motor.
Figure 3:
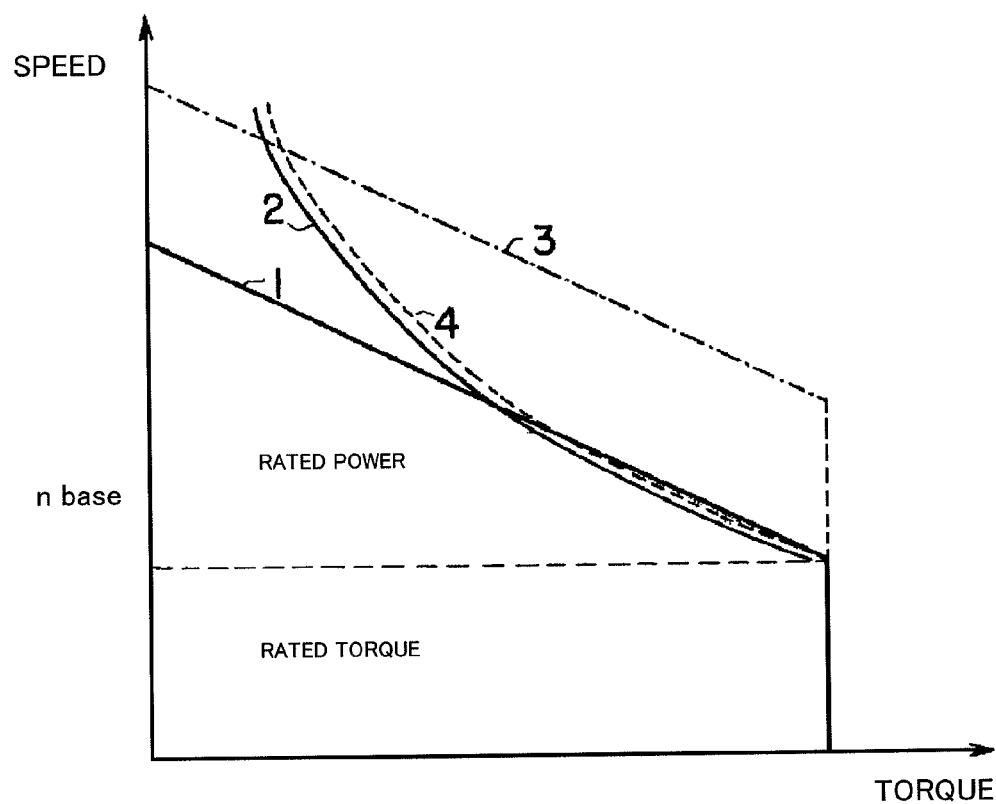
FIG. 3 is a graph overlaying motor load characteristic curves on motor characteristic lines.
Figure 4:
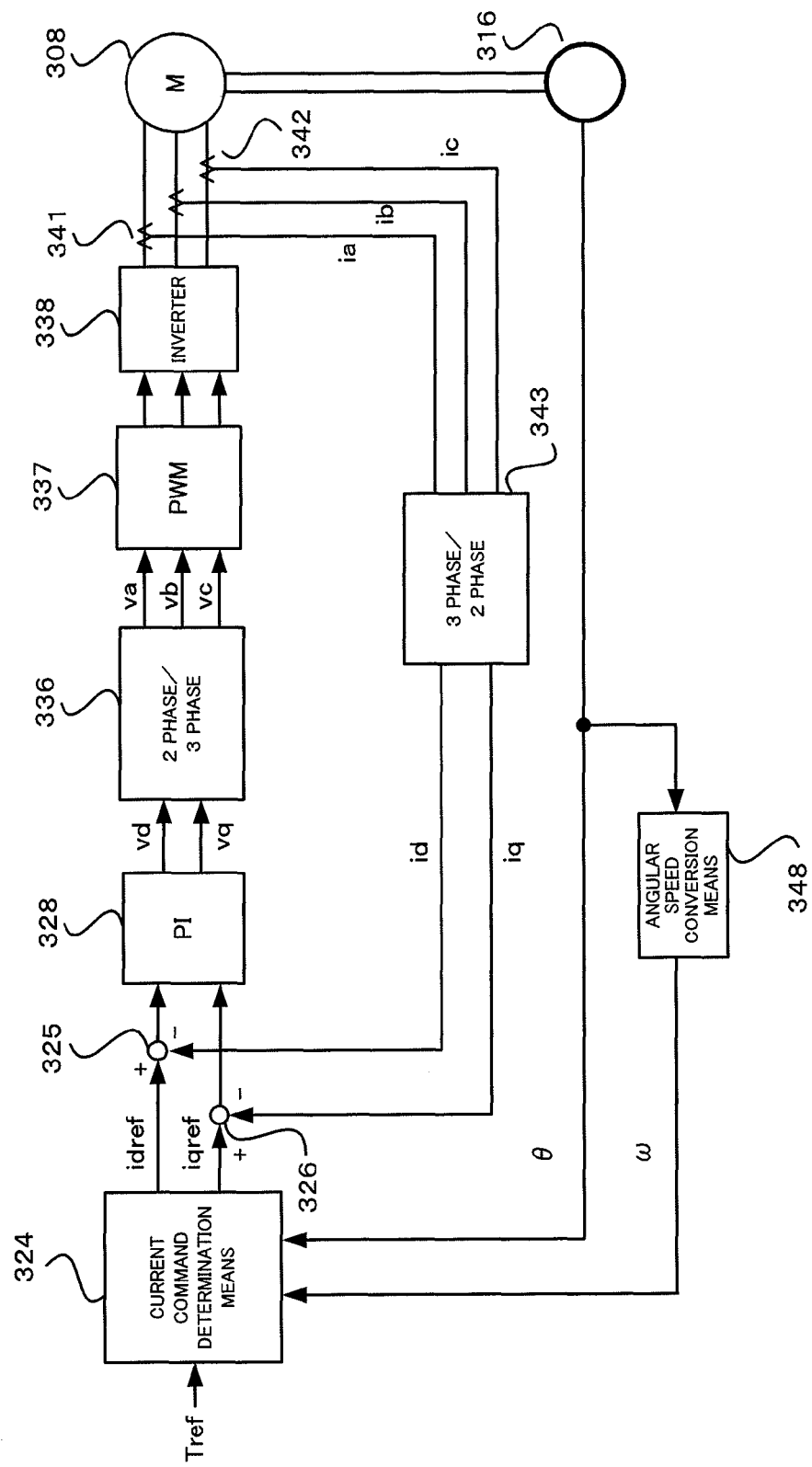
FIG. 4 is a block diagram of a configuration example of a conventional vector controller.
Figure 5:
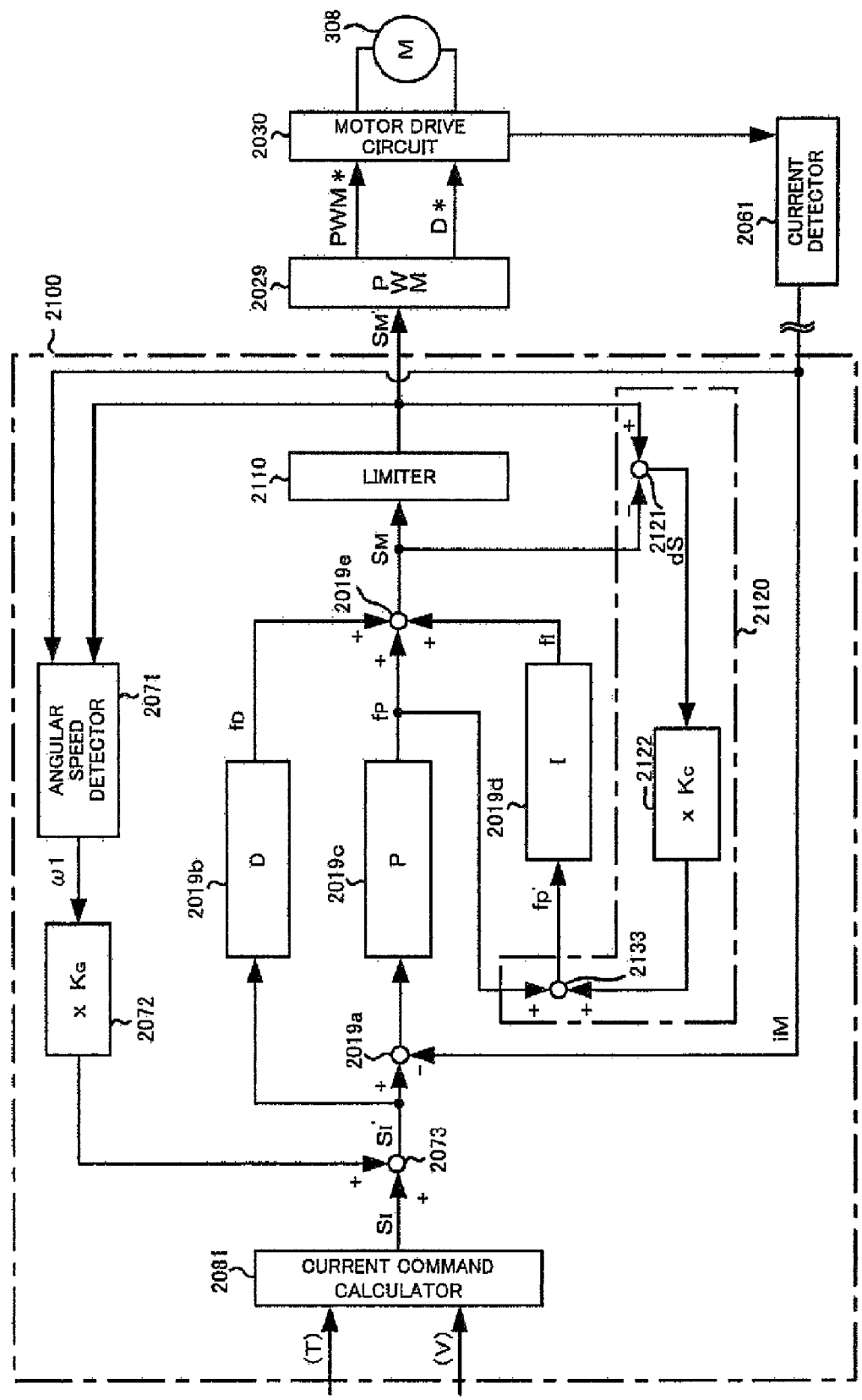
FIG. 5 is a block diagram of a configuration example of a conventional controller using a current limit value.

The basic idea that distinguishes the present invention from the current limiter disclosed in Japanese Patent Application Laid-open No. 08-142886 A is that, instead of imposing a limit on a current command value calculated on the basis of a steering assist current command value, a predetermined limit is imposed on a steering assist current command value on the basis of which a calculation is performed to drive a motor. Another distinction is that the rated output characteristic and angular speed (rotational speed) ω of the motor and a battery voltage Vdc (DC link voltage) are used as conditions for determining the limit value of the current command value. That is, the current command value to the motor is controlled on the basis of the characteristic 2 (rated output characteristic) or the characteristic 4 (maximum output characteristic) shown in FIG. 3. If the current command value is limited by the maximum output characteristic of the characteristic curve 4, the current limit value will be maximized so that the electric power steering system can operate in a manner most true to steering wheel operation.

The current limit value for when the maximum output characteristic is used as the rated output characteristic will be described below.

The rated output Pn of the motor can be determined by the following Formula 11 as a value indicative of the motor output:

$$Pn = Tn \cdot \omega_n \quad \text{(Formula 11)}$$

where "Tn" is the rated torque and "$\omega_n$" the rated angular speed.

The maximum output Pmax of the motor means the maximum output available at any time and is a characteristic given by the manufacturer of the motor. Generally, the maximum output Pmax and the rated output Pn have a relationship as given by Formula 12 below:

$$Pmax > Pn \quad \text{(Formula 12)}$$

The above Formula 12 means that the point of the maximum output Pmax of the motor differs from the rated operation point of the motor. This difference also depends on the circuit configuration of the motor drive. The motor of the electric power steering system yields the maximum output Pmax in a higher rotational speed range than the rated angular speed $\omega_n$.

Figure 6:
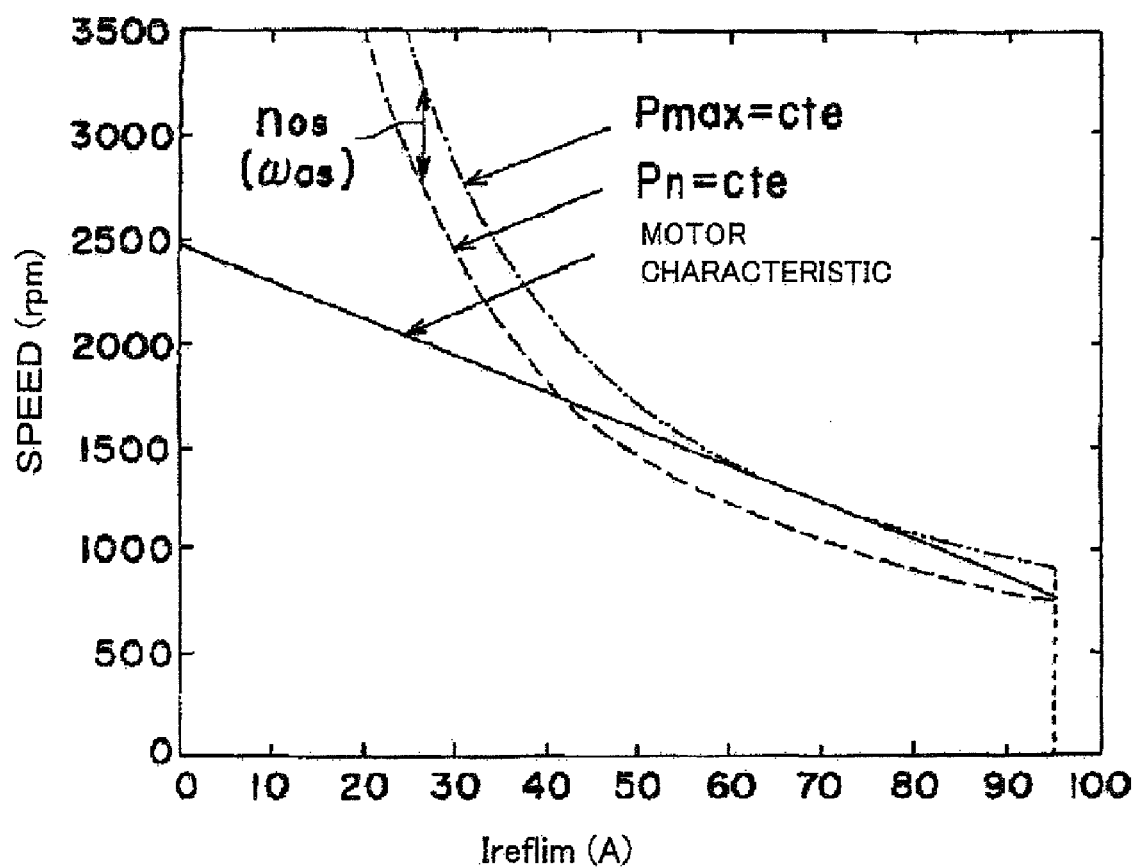
FIG. 6 is a graph illustrating the principle of the present invention.

When the characteristic curve 2 representing the rated output Pn of the motor and the characteristic curve 4 representing the maximum output Pmax are plotted on the same graph, FIG. 6 is obtained. FIG. 6 shows that the characteristic curve 4 representing the maximum output Pmax is obtained by shifting the characteristic curve 2 representing the rated output Pn by n-offsets ("$n_{os}$") in the direction of the rotational speed axis (vertical axis). When expressed in angular speed ω[rad/s] corresponding to the rotational speed N [rpm], the offset $n_{os}$ can be expressed as angular speed "$\omega_{os}$". That is, the angular speed $\omega_{os}$ is shifted by the offset $n_{os}$ with respect to the direction of the rotational axis. When the maximum output angular speed is defined as "$\omega_n + \omega_{os}$" the relationship above will be given by Formula 13 below.

$$Pmax = Tn \cdot (\omega_n + \omega_{os}) \quad \text{(Formula 13)}$$

The present invention is essentially based on the maximum output Pmax, which is the rated output characteristic. This means that, under steady state conditions, the motor must not produce an output exceeding the maximum output Pmax. This requirement can be expressed by Formula 14 below:

$$P < Pmax \quad \text{(Formula 14)}$$

Because the power P is the product of the torque T and the angular speed ω (P=T·ω), the limit Tlim of the torque T can be translated, by the above Formula 14, into the following Formula 15:

$$Tlim < Pmax / \omega_e \quad \text{(Formula 15)}$$

where "$\omega_e$" is a mechanical angular speed of the motor.

Then, substitution of Formula 13 into Formula 15 yields the following Formula 16:

$$Tlim < Tn \cdot (\omega_n + \omega_{os}) / \omega_e \quad \text{(Formula 16)}$$

From the above Formula 16, the limit value Ireflim of the current command value is determined and can be given as Formula 17:

$$Ireflim = Tlim / Kt < (Tn \cdot (\omega_n + \omega_{os}) / \omega_e) / Kt \quad \text{(Formula 17)}$$

Formula 17 means that, based on the maximum output characteristic, which is the rated output characteristic of the motor, the limit value Ireflim of the current command value is determined from a rotational number (angular speed $\omega_e$) of the motor and is used to control the motor drive current.

Then, from the above Formulas 4 and 17, Formula 18 below is derived:

$$Ireflim < In \cdot (\omega_n + \omega_{os}) / \omega_e \quad \text{(Formula 18)}$$

where "In" is a rated current value of the motor.

Formula 18 makes the use of the torque constant Kt of the motor unnecessary. When the current command value is limited by the angular speed ω, the foregoing Formula 17 or 18 provides the basic formula.

Figure 7:
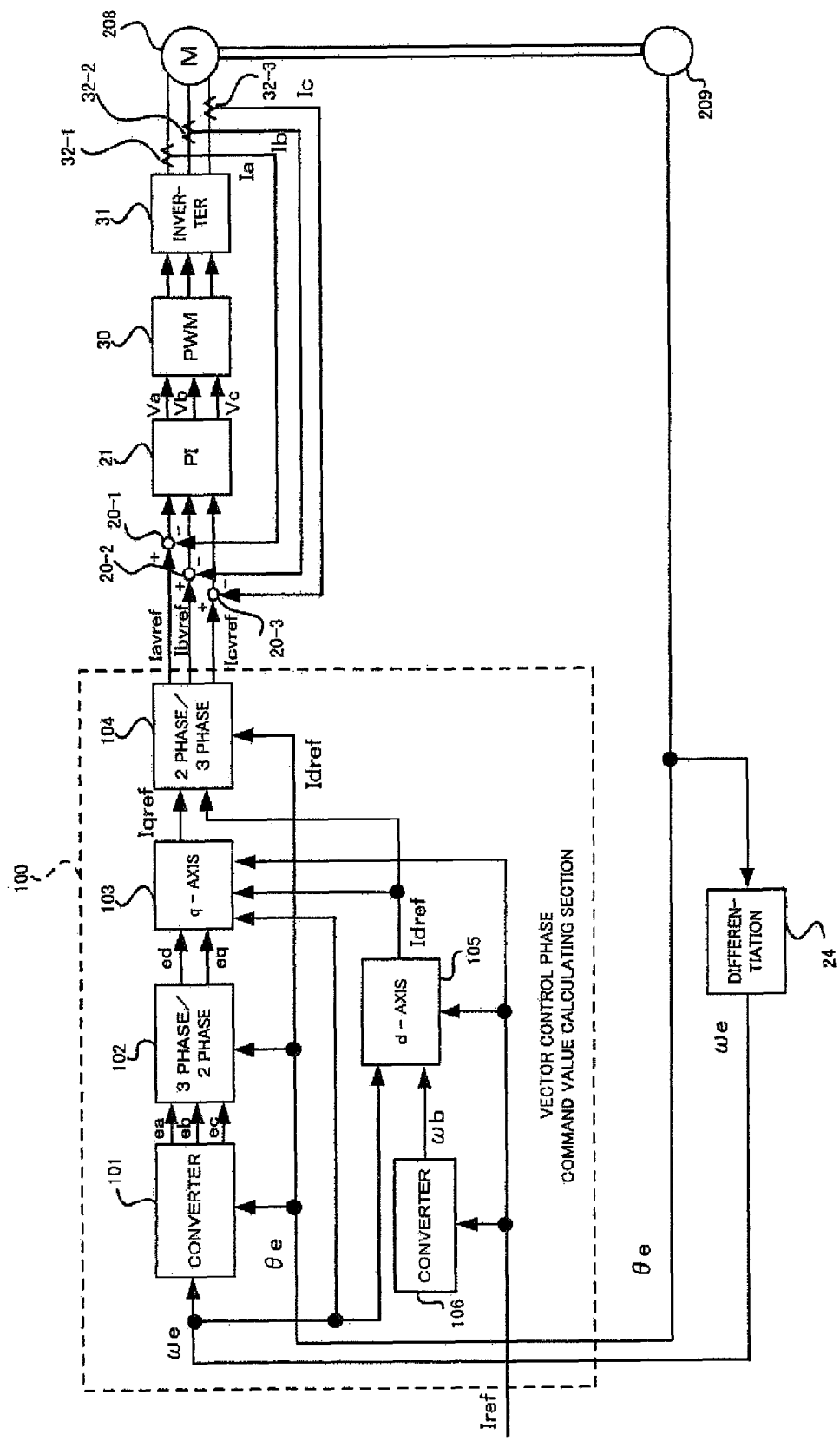
FIG. 7 is a block diagram of a configuration example of a pseudo-vector control to which the present invention can be applied.

Before describing the present invention, an explanation will be given, referring to FIG. 7, of a pseudo-vector control (hereinafter refer to "PVC") as a possible example of an application of the present invention.

Generally, in the vector control of a three-phase motor, calculations are performed with a current command value divided into two axial components, namely d-axis (flux control) and q-axis (torque) components. A PI-control is also performed with three-phase current feedback from the motor divided into a d-axis component and a q-axis component. At the final stage, where a gate signal is fed to the inverter, two phase-to-three phase conversion occurs to control the three phase motor. As opposed to the vector control thus performed, the PVC control is a method wherein calculations using the d-axis and q-axis components continue up to the stage of calculating three phase current reference values Iavref, Ibvref and Icvref, and three-phase control is performed at the stage where the motor current is feedbacked for the PI-control.

The current command value calculator (not shown) calculates a steering assist current command value Iref based on the steering torque T, the vehicle speed and so on. The steering assist current command value Iref is inputted to a converter 106, a q-axis current reference value calculator 103 and a d-axis current reference value calculator 105 in a vector control phase command value calculating section 100. In place of the steering assist current command value Iref, a torque command value Tref (=Kt·Iref) converted into a torque can be used. A resolver 209 detects and sends the angle $\theta_e$ of a motor 208 as an input to a differentiation circuit 24 that determines an angular speed $\omega_e$. The steering assist current command value Iref, the angle $\theta_e$ and the angular speed $\omega_e$ are inputted to the vector control phase command value calculating section 100 that determines current reference values Iavref, Ibvref and Icvref, which are inputted to a PI-controller 21 via their respective corresponding subtractors 20-1, 20-2 and 20-3.

In the vector control phase command value calculating section 100, the d-axis current reference value calculator 105 determines a d-axis current reference value Idref shown in Formula 19 below. The converter 106 converts the steering assist current command value Iref into a base angular speed $\omega_b$.

$$Idref = -|Iref| \cdot \sin(\cos^{-1}(\omega_b/\omega_e)) \quad \text{(Formula 19)}$$

As can be seen from "$\cos^{-1}(\omega_b/\omega_e)$" in Formula 19, if the angular speed $\omega_e$ of the motor is greater than the base angular speed $\omega_b$, the d-axis current reference value Idref will be obtained. That is, when the angular speed $\omega_e$ of the motor is greater than the base angular speed $\omega_b$, the field-weakening control is performed.

Meanwhile, a converter 101 receives the angle $\theta_e$ and the angular speed $\omega_e$ and calculates phase back EMF ea, eb and ec of the motor 208. A three phase-to-two phase converter 102 calculates a d-axis and q-axis back EMF ed and a q-axis back EMF eq. Then, a q-axis current reference value calculator 103 receives the d-axis and q-axis back EMFs ed and eq, the angular speed $\omega_e$, the d-axis current reference value Idref, and the steering assist current command value Iref to calculate a q-axis current reference value Iqref according to the following Formula 20:

$$Iqref = \frac{2}{3}(Iref \times \omega_m - ed \times Idref)/eq \quad \text{(Formula 20)}$$

Therefore, if no the field-weakening control is performed, "Idref=0" and hence "Iqref=Iref" will hold. A two phase-to-three phase converter 104 receives the d-axis current reference value Idref and the q-axis current reference value Iqref to determine the three phase current reference values Iavref, Ibvref and Icvref.

The control subsequent to the calculation of the three phase current reference values Iavref, Ibvref and Icvref in the two phase-to-three phase converter 104 is identical to a conventional feedback control. In other words, current detection circuits 32-1, 32-2 and 32-3 respectively detect phase currents Ia, Ib and Ic of the motor 208, and the subtractors 20-1, 20-2 and 20-3 respectively determine the current deviations from the three phase current reference values Iavref, Ibvref and Icvref as inputs to the PI-controller 21. The PI-controller 21 performs a feedback control by calculating voltage command values Va, Vb and Vc which reduce the current deviations to zero. A PWM-controller 30 receives the voltage command values Va, Vb and Vc and outputs PWM-gate signals to an inverter 31. The inverter 31 is PWM-controlled by the gate signals and current-controlled so that the deviation between each of the phase currents Ia, Ib and Ic and each of the current reference values Iavref, Ibvref and Icvref will be zero.

Thus the principle of the PVC control has been outlined. As described above, if the angular speed $\omega_e$ of the motor 208 is equal to or smaller than the base angular speed $\omega_b$, the d-axis current reference value Idref will be zero. That is, because no the field-weakening control is performed, "Iqref=Iref" holds. The phase currents Ia, Ib and Ic are smaller than the current In at the maximum output, and no PWM-duty saturation (duty=100%) occurs, and hence no problem arises. However, if the angular speed $\omega_e$ of the motor 208 exceeds the base angular speed $\omega_b$, the d-axis current reference value Idref will no longer be zero. Consequently, $\sqrt{(Iq^2+Id^2)}$ may exceed the current In at the maximum output. An attempt to output a motor current equal to or greater than the current In at the maximum output will result in a duty of 100%, causing a large torque ripple and problems such as abnormal noise in the motor 208. Therefore, if the angular speed $\omega_e$ of the motor 208 increases and exceeds the level at which the field-weakening control is performed, it will be necessary to limit the steering assist current command value Iref with the variable limit value Ireflim shown in the above Formula 18. Moreover, if the field-weakening control is performed which exceeds the limit of performance of the motor, another problem will occur in that the noise becomes louder due to a large torque ripple or the like.

Accordingly, in the present invention, the limit of the current command value at the base speed (Id=0) is calculated from the maximum voltage and current conditions (Vmax, Imax) of the motor (Vmax and Imax are the voltage and the current at the maximum output Pmax in Formula 12) to calculate the limit of the current command value in a high-speed range (when a negative d-axis current command value Id is inputted to the control system). The required motor torque-speed (T-n) characteristic is specified on the basis of the customer performance specifications. The d-axis current command value Id for the field-weakening control is calculated, using the maximum voltage and the current conditions (Vmax, Imax), in response to the input of the steering assist current command value Iref, the motor angular speed $\omega_e$, and the battery voltage Vdc. Each of the foregoing calculations is performed with look-up tables or the like, designed to accelerate a calculation by a microcomputer and so on. Changes in the battery voltage Vdc can be applied by calculating the current caused by changes in the motor speed and voltage. The calculation of these change signals is also performed with an additional look-up table or the like.

Figure 8:
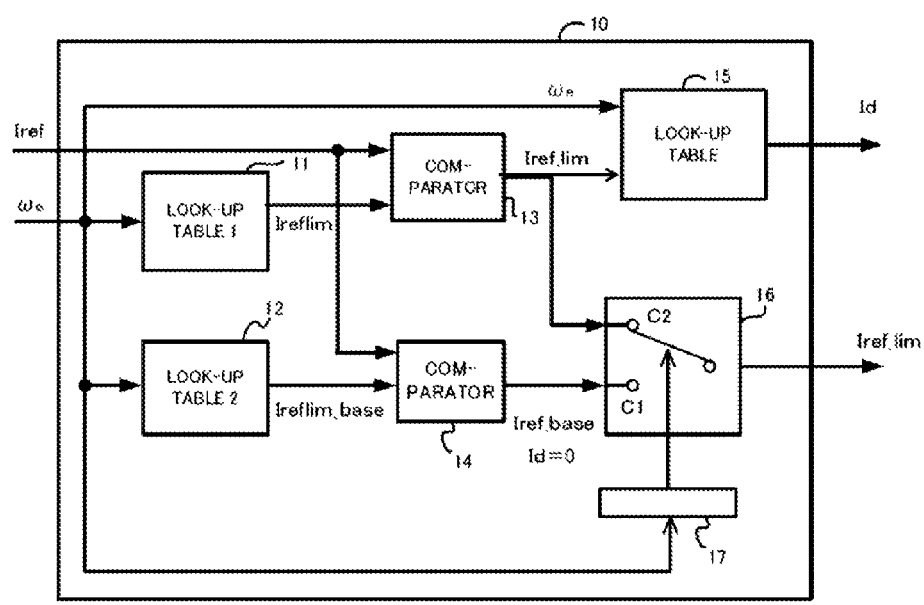
FIG. 8 is a block diagram of a configuration example of a current command value calculator.

FIG. 8 shows a configuration of a current command value calculator according to the present invention. The steering assist current command value Iref provides an input to comparators 13 and 14. An estimated or detected angular speed $\omega_e$ is inputted to look-up tables 11 and 12 as well as to an additional look-up table 15 and furthermore to a detecting and switching unit 17 that determines whether the angular speed $\omega_e$ is equal to or greater than the base angular speed $\omega_b$ to switch contacts c1 and c2 of the switch 16. The limit value Ireflim of the current command value determined with the look-up table 11 is inputted to the comparator 13, while the limit value Ireflim_base of the current command value determined with the look-up table 12 is inputted to the comparator 14. In this particular embodiment, the battery voltage Vdc is not required. The limit value Iref_lim of the current command value outputted from the comparator 13 is supplied to contact c2 of the switch 16, while the base limit value Iref_base of the current command value outputted from the comparator 14 is supplied to contact c1 of the switch 16.

First, the calculation of the steering assist current command value Iref in the present invention will be described below.

Assuming that the phases of the three-phase motor 5 are phases a, b and c, respectively, the phase voltage $v_{an}$ of phase "a", for example, can be given by Formula 21 below where "$i_a$" is the phase current, "Ra" the phase resistance, "La" the phase inductance, and "$e_a$" the phase back EMF:

$$V_{an}=i_a \cdot Ra+La \cdot di_a/dt+e_a \quad \text{(Formula 21)}$$

For a balanced motor, each phase of which exhibits identical electrical characteristics to the others, in the case of a single phase, the above Formula 21 is usually modified as Formula 22 below:

$$v=i \cdot R+L \cdot di/dt+e \quad \text{(Formula 22)}$$

where "R=Ra=Rb=Rc" is the phase resistance of the motor, "L=La=Lb=Lc" the motor phase inductance, and "e" the phase back EMF.

The voltages $v_d$ and $v_q$ on the d-axis and the q-axis can be given respectively by Formulas 23 and 24:

$$v_d=i_d \cdot R+Ld \cdot di_d/dt-\omega_e \cdot Ld \cdot i_q \quad \text{(Formula 23)}$$

$$vq=i_q \cdot R+Lq \cdot di_q/dt+\omega_e \cdot Lq \cdot id+\omega_e \cdot \psi \quad \text{(Formula 24)}$$

where "Ld" is the d-axis inductance of the motor, "Lq" the q-axis inductance of the motor. In an SPM (Surface PM) motor, "Ld=Lq=L" holds. Meanwhile, "$\psi$" is the magnetic flux on the d-axis. Generally, "$\psi=\frac{4}{3} \cdot Ke/(2 \times p)$" holds ("Ke" is the back EMF constant and "p" the number of polar pairs).

In a sinusoidal motor, the d-axis current $i_d$ and the q-axis current $i_q$ change in a direct current-like manner and their differentials are zero. Therefore, the above Formulas 23 and 24 are given by steady-state equations as in Formulas 25 and 26 below, respectively:

$$vd=id \cdot R-\omega_e \cdot Ld \cdot i_q \quad \text{(Formula 25)}$$

$$v_q=i_q \cdot R+\omega_e \cdot Lq \cdot i_d+\omega_e \cdot \psi \quad \text{(Formula 26)}$$

Conversely, in a square-wave motor the q-axis current $i_q$ is not a direct current (DC), and hence its change and differential under steady-state conditions should take "$\Delta i_q \neq 0$" and "$di_q/dt \neq 0$" into consideration. Therefore, the q-axis current $i_q$ can be defined by Formula 27 below:

$$i_q=Iref+\Delta i_q \quad \text{(Formula 27)}$$

where "Iref" is the current command value, and "$\Delta i_q$" the change amount of the q-axis current $i_q$ ($\Delta i_q=i_q-$Iref).

Therefore, substitution of Formula 27 into Formulas 25 and 26 yields Formulas 28 and 29, respectively:

$$v_d=i_d \cdot R-\omega_e \cdot Ld \cdot (Iref+\Delta i_q) \quad \text{(Formula 28)}$$

$$v_q=(Iref+\Delta i_q) \cdot R+Lq \cdot di_q/dt+\omega_e \cdot Lq \cdot i_d+\omega_e \cdot \psi \quad \text{(Formula 29)}$$

The differential "$Lq \cdot di_q/dt$" in Formula 29 is difficult to calculate based on a large variable in a function of speed and current. However, if the maximum current constant is maintained, the peak of "$Lq \cdot di_q/dt$" can be replaced with the speed function given by Formula 30 below:

$$Lq \cdot diq/dt=Lq \cdot di_q/d\theta \cdot d\theta/dt=Lq \cdot di_q/d\theta \omega_e=k \cdot \omega_e \quad \text{(Formula 30)}$$

where "k" is a coefficient for the linear relationship between the q-axis current $i_q$ and the differential of the angular speed $\omega_e$.

Therefore, Formulas 31 and 32 below hold:

$$v_d=i_d \cdot R-\omega_e \cdot Ld \cdot Iref-\omega_e \cdot Ld \cdot \Delta i_q \quad \text{(Formula 31)}$$

$$v_q=i_{ref} \cdot R+\omega_e \cdot Lq \cdot i_d+\omega_e \cdot \psi+k \cdot \omega_e+\Delta i_q \cdot R \quad \text{(Formula 32)}$$

"$\omega_e \cdot Ld \cdot \Delta i_q$" in Formula 31 and "$k \cdot \omega_e+\Delta i_q \cdot R$" in Formula 32 are additional terms applicable to a square-wave motor.

A square-wave motor can be controlled by the PVC method described above (refer to FIG. 7). The waveforms of the current and other variables of a square-wave motor are not sinusoidal. Hence, d-q expressions cannot be used for the analysis of a square-wave motor. However, introduction of another change amount $\Delta i_q$ and coefficient k allows analysis on the d-q axis.

The back EMF waveform and current waveform of a sinusoidal motor are sinusoidal. When a three-phase/d-q axis conversion is performed, both the d-axis component (flux control component) and the q-axis component (torque component) will each have a direct current value (constant value). Conversely, in a square-wave motor, the back EMF waveform and current waveform are pseudo-rectangular, and the sinusoidal wave of the first order component is superposed with the sinusoidal waves of the third-, fifth-, seventh-, . . . , nth order waves. When a three-phase/d-q axis conversion is performed, neither the d-axis component nor the q-axis component has a direct current value (constant value). Instead, these components will each become a function of electrical angle. More specifically, the fifth and seventh order components of a three-phase current occur as sixth-order components on the d-q axis. Similarly, the eleventh- and thirteenth-order components of a three-phase current occur as the twelfth-order component on the d-q axis, while the third-, ninth-, . . . , nth order components are zero-phase components and disappear. The calculation for determining the limit values is complicated with the components being functions of the electrical angle and hence needs to be simplified. Moreover, what is aimed at here is to determine the limit values. Therefore, the maximum value of a vibrating component is dealt with here. The change amount $\Delta i_q$ and the coefficient k are parameters for the maximum value of a value dependent on the electrical angle. Introduction of these parameters, which are not functions of the electrical angle, allows calculation of the limit value of a square-wave motor in a similar way to a sinusoidal motor.

The maximum value and theoretical value of the q-axis current $i_q$ are expressed by Formulas 33 and 34 below, respectively:

$$i_q=Iref+\Delta i_q \quad \text{(Formula 33)}$$

$$i_q=Iref+(i_3+i_5)\sin 6\theta+(i_{11}+i_{13})\sin 12\theta+ \quad \text{(Formula 34)}$$

Next, an explanation will be given of a method for calculating the limit value Ireflim of the current command value and the d-axis current command value Id in the current command value calculator. First, the voltage and current limit conditions are as follows:

(1) The voltage constant is given as below:

$$\sqrt{v_d^2+v_q^2} \leq V_{max}=(V_{dc}/2) \cdot k_s \qquad \text{(Formula 35)}$$

or $$v_d^2+v_q^2 \leq V\text{max}^2 \qquad \text{(Formula 36)}$$

where "Vdc" is the battery voltage measured by the input to the controller, and "$k_s$" the safety coefficient for the modulation technique.

(2) The current constant is given as below:

$$i_d^2+i_q^2 \leq I\text{max}^2 \qquad \text{(Formula 37)}$$

where "Imax" is the maximum current of the motor or the inverter and is small under steady-state conditions.

Substitution of Formulas 31 and 32 into Formula 36 yields Formula 38 below:

$$V\text{max}^2=(i_d \cdot R-\omega_e \cdot L \cdot I_{reflim}-\omega_e \cdot L \cdot \Delta i_q)^2+(I_{reflim} \cdot R+\omega_e \cdot L \cdot I_d+\omega_e \cdot \psi+k \cdot \omega_e+\Delta i_q \cdot R)^2 \qquad \text{(Formula 38)}$$

Then, the d-axis current command value Id derived from Formula 38 is given as:

$$I_d = A_1 \cdot \left(\frac{1}{\omega_e}\right)^2 - \frac{R_m}{L_m} \cdot \frac{1}{\omega_e} \cdot (I_{ref\,lim} + \Delta I_q) - B_1 \qquad \text{(Formula 39)}$$

where $A_1$ and $B_1$ are given by Formulas 40 and 41 below, respectively:

$$A_1 = \frac{(V_{max}^2 - I_{max}^2 \cdot R^2)}{2 \cdot (\Psi + k) \cdot L} \qquad \text{(Formula 40)}$$

$$B_1 = \frac{(I_{max}^2 \cdot R^2 + (\Psi + k)^2)}{2 \cdot (\Psi + k) \cdot L} \qquad \text{(Formula 41)}$$

Moreover, when Formula 37 is substituted into Formula 39 and solved for with respect to the current command value Iref, Formula 42 below is obtained:

$$I_{ref\,lim} = \frac{\frac{R}{L} \cdot \frac{1}{\omega_e} \cdot \left[A \cdot \left(\frac{1}{\omega_e}\right)^2 - B - \frac{R}{L} \cdot \frac{1}{\omega_e} \cdot \Delta I_q\right] + \sqrt{I_{max}^2 \cdot \left[1+\left(\frac{R}{L} \cdot \frac{1}{\omega_e}\right)^2\right] - \left[A \cdot \left(\frac{1}{\omega_e}\right)^2 - B - \frac{R}{L} \cdot \frac{1}{\omega_e} \cdot \Delta I_q\right]^2}}{1+\left(\frac{R}{L} \cdot \frac{1}{\omega_e}\right)^2} \qquad \text{(Formula 42)}$$

This is the limit value of the current command value Iref. When the d-axis current command value Id is the value of the maximum current, Formula 43 will be used instead:

$$I_{d\,max}=\sqrt{I_{max}^2-I_{reflim}^2} \qquad \text{(Formula 43)}$$

In case of a sinusoidal motor, "$\Delta I_q=0$" and "$k=0$" hold. Moreover, $\Delta I_q$ and k remain constant in the calculation of Formula 42.

It follows from the foregoing formulas that, if the motor parameters and the battery voltage Vdc are constant, the current command value Iref is a function of speed only and given by Formula 44 below:

$$\text{Ireflim}=f(\omega_e) \qquad \text{(Formula 44)}$$

Any change in the battery voltage Vdc will need to be taken into consideration. Hence:

$$\text{Ireflim}=f(\omega_e, V_{dc}) \qquad \text{(Formula 45)}$$

The algorithm uses Formula 42 to calculate the limit value Ireflim of the current command value as follows:

(1) If Iref>Ireflim,

Iref=Ireflim and Id=Idmax.

(2) If Iref≦Ireflim,

Iref=Iref and Id=Id.

Figure 9:
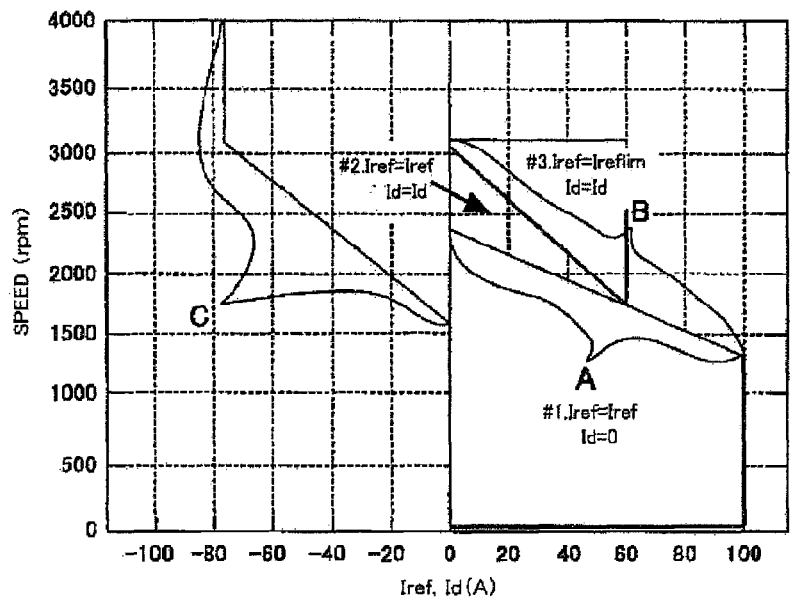
FIG. 9 is a graph showing a d-axis current command value, a current command value and typical motor rotational speed characteristics (three zones).
Figure 10:
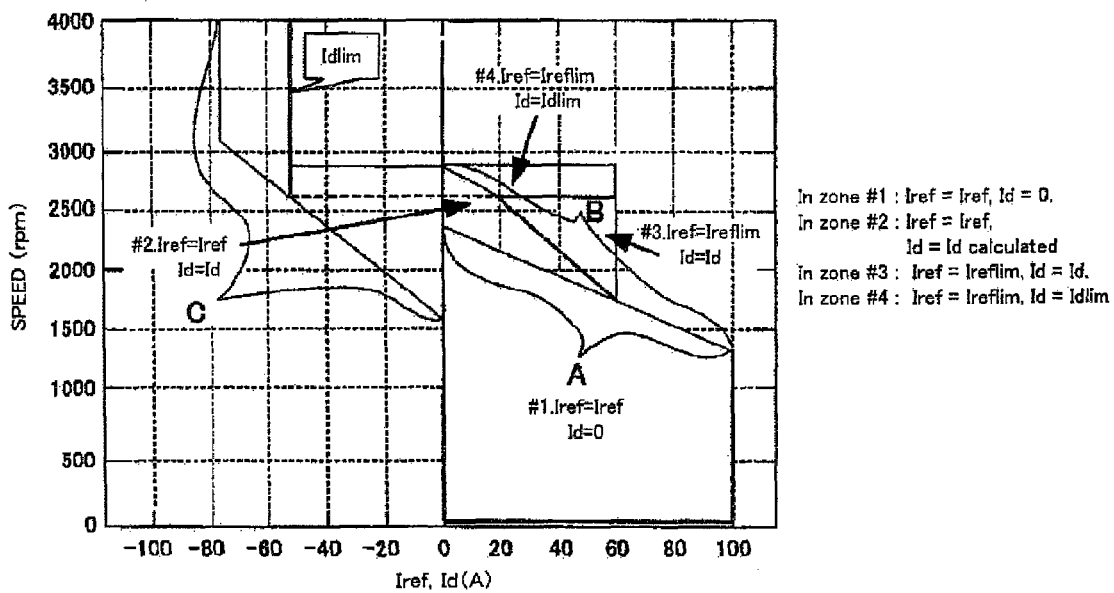
FIG. 10 is a graph showing a d-axis current command value, a current command value and typical motor rotational speed characteristics (four zones).

FIG. 9 shows the d-axis current command value Id, the current command value Iref, and typical motor rotational speed characteristics (three zones). The data of characteristics A, B and C are respectively stored in the look-up tables 12, 11 and 15. Similarly, FIG. 10 shows the d-axis current command value Id, the current command value Iref, and typical motor rotation characteristics (four zones). The data of characteristics A, B and C are stored in the lookup tables 12, 11 and 15, respectively.

Figure 11:
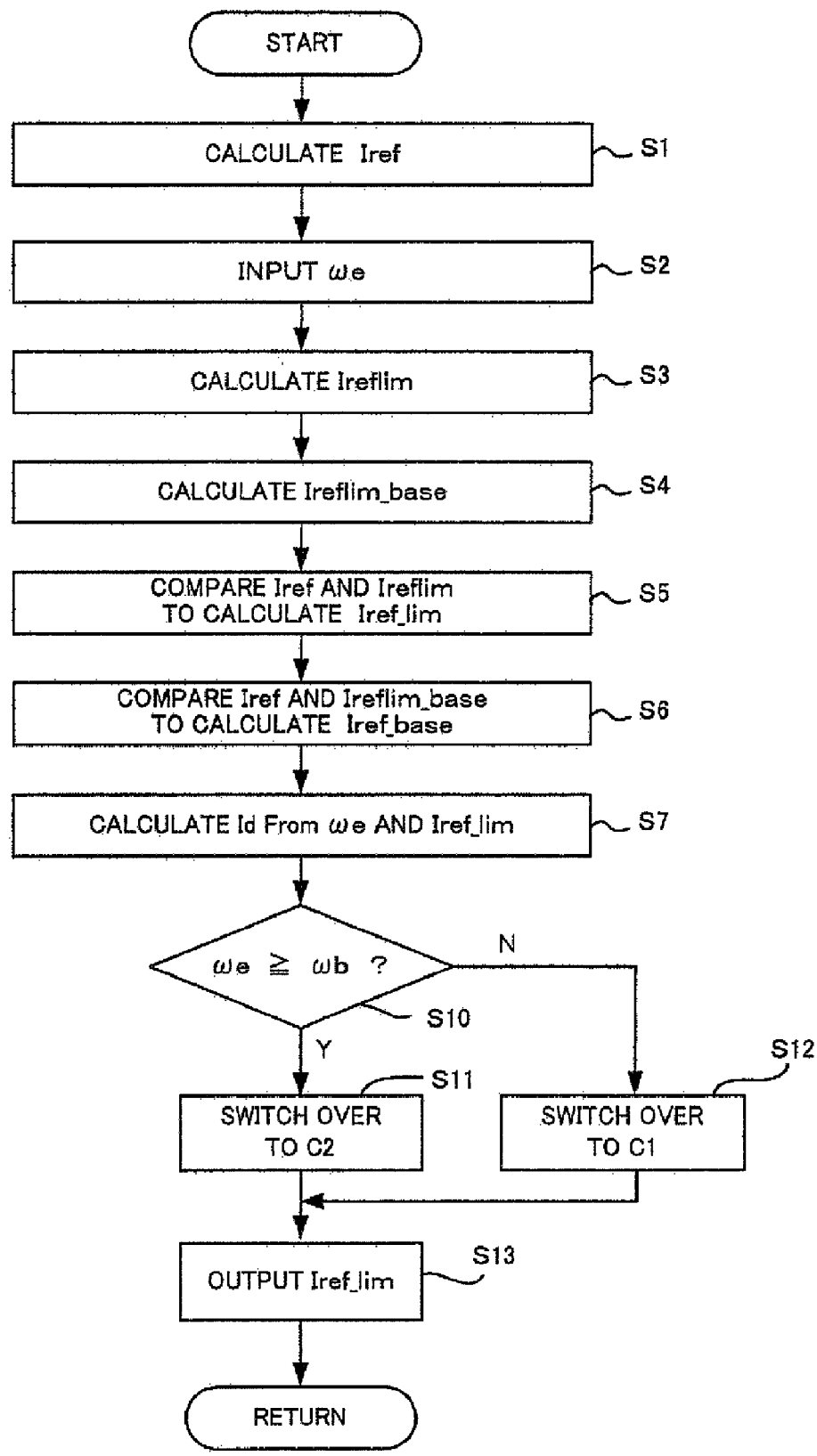
FIG. 11 is a flow chart showing a typical sequence of operational steps in accordance with a preferred embodiment of the present invention.

Referring to a flow chart in FIG. 11, a description will be given below of a typical sequence of operational steps with such a configuration.

First, the steering assist current command value calculator calculates a steering assist current command value Iref based on the steering torque and the vehicle speed (Step S1) and makes an input of the angular speed $\omega_e$ of the motor 5 (Step S2). The order of these two steps is interchangeable. Next, a look-up table 11 is used to determine the limit value Ireflim of the current command value from the inputted angular speed $\omega_e$ on the basis of the characteristic B in FIG. 9 or 10 (Step S3), and another look-up table 12 is used to determine the base limit value Ireflim_base of the current command value on the basis of the characteristic A in FIG. 9 or 10 (Step S4). The comparator 13 receives the input of the limit value Ireflim of the current command value, while another comparator 14 receives the input of the base limit value Ireflim_base of the current command value. The order of calculation of the limit value Ireflim of the current command value and the base limit value Ireflim_base of the current command value is interchangeable.

The comparator 13 compares the steering assist current command value Iref and the limit value Ireflim of the current command value to determine the limit Iref_lim of the current command value (Step S5), while the comparator 14 compares the steering assist current command value Iref and the base limit value Ireflim_base of the current command value to determine the limit value Iref_base of the current command value and the d-axis current command value "Id=0" (Step S6). The limit value Iref_lim of the current command value is inputted to the contact c2 of the switch 16, while the base limit value Ireflim_base of the current command value and the d-axis current command value "Id=0" are both inputted to the contact c1 of the switch 16. A look-up table 15 is used to determine the d-axis current command value Id from the angular speed $\omega_e$ and the limit value Iref_lim of the current command value on the basis of the characteristic C in FIG. 9 or 10 (Step S7).

Then, a detecting and switching unit 17 determines whether or not the angular speed $\omega_e$ is equal to or greater than the base angular speed $\omega_b$ (Step S10). If the angular speed $\omega_e$ is less than the base angular speed $\omega_b$, the detecting and switching unit 17 switches the contact of the switch 16 over to the contact c1 (Step S12) and outputs the base limit value Iref_base of the current command value and the d-axis current command value "Id=0", both from the comparator 14, as the limit value Iref_lim (Step S13). If the angular speed $\omega_e$ is equal to or greater than the base angular speed $\omega_b$, the detecting and switching unit 17 switches the contact of the switch 16 over to the contact c2 (Step S11) and outputs the limit value Iref_lim of the current command value from the comparator 13 without change as the limit value Iref_lim of the current command value (Step S13).

Next, a description will be given of another embodiment of the present invention.

Figure 12:
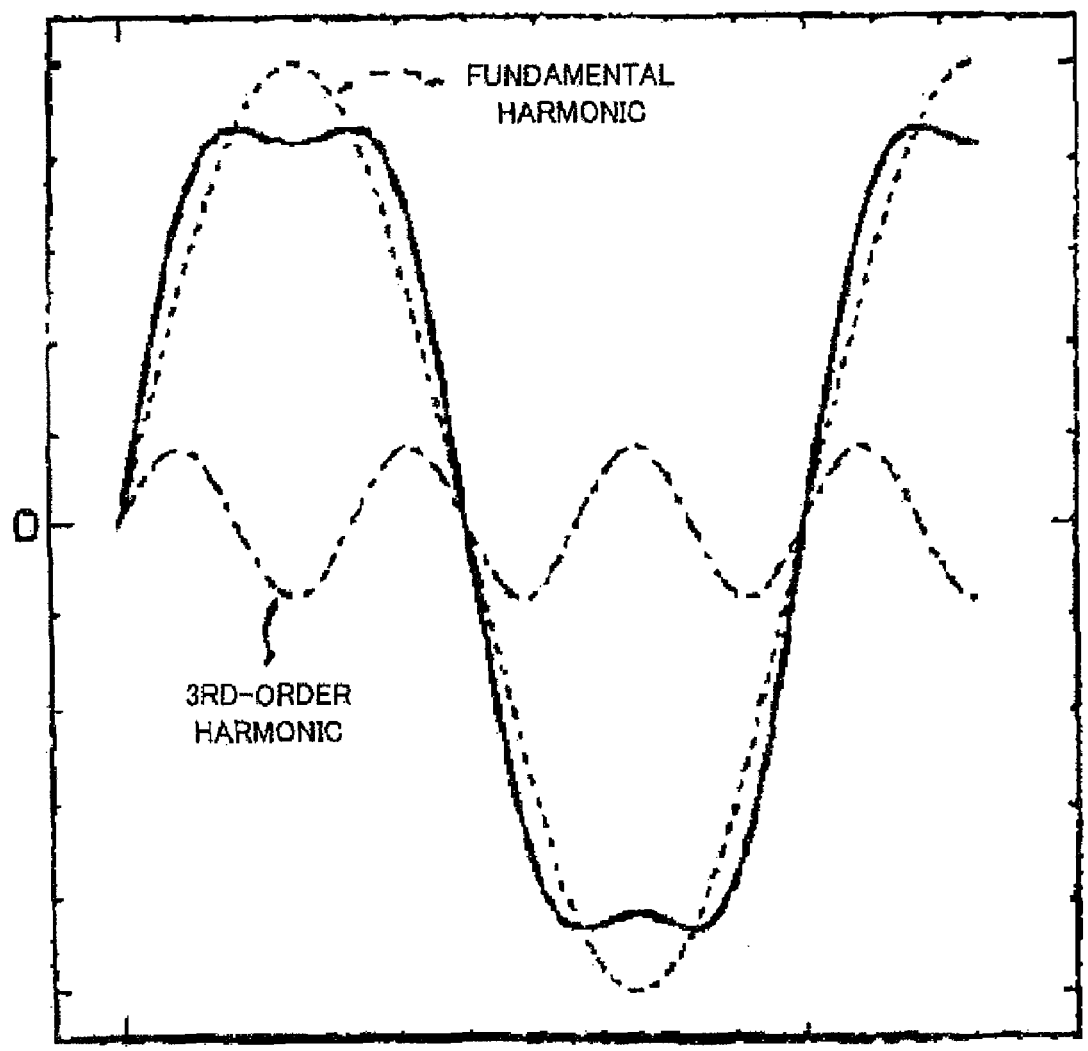
FIG. 12 is a waveform graph showing the relationship between a fundamental harmonic, a third order harmonic and an actual voltage applied to a motor.

In this embodiment, a third order harmonic is added to voltage, namely, duty. The consequent partial duty reduction helps to prevent the system from becoming saturated. This means a 15% increase in a battery voltage Vdc. As shown in FIG. 12, the third order harmonic (dashed-and-dotted line) flattens the peak of the fundamental harmonic (broken line) to reduce the voltage (solid line) actually applied to a motor. If the voltage actually applied, shown as a solid line, is almost equal to the battery voltage Vdc, the fundamental harmonic (broken line) will exceed the battery voltage Vdc. Then, superimposition of the third harmonic flattens the peak, making it appear that the duty saturation is unlikely to occur or that the battery voltage Vdc has increased. Theoretically, the battery voltage Vdc has seemingly increased by approximately ⅙. However, in practice, the increase is adjusted to 15%.

Therefore, Formula 46 below holds:

$$V\text{max} = Vdc/2 \times k \times 1.15 \quad \text{(Formula 46)}$$

The current constant is represented by the above Formula 37. The general Formula for calculating the limit value Ireflim of the current command value and the d-axis current command value Id is based on a voltage and a current forcibly controlled as explained above by the above Formulas 36 and 37. That is, neither the motor characteristics nor the maximum current Imax and the maximum voltage Vmax can be exceeded. Then, substitution of Formulas 25 and 26 into Formula 36 yields Formula 47 below:

$$(i_d \cdot R - \omega_e \cdot L \cdot Iref)^2 + (Iref \cdot R + \omega_e \cdot L \cdot i_d + \omega_e \cdot \psi)^2 = V\text{max}^2 \quad \text{(Formula 47)}$$

The foregoing Formula 47 is the basic formula for calculating the d-axis current command value Id and the limit value Ireflim of the current command value with respect to the maximum voltage condition. While the motor angular speed $\omega_e$ is an input value and the battery voltage Vdc a parameter, it should be noted that this single formula contains two unknowns "Id and Ireflim". To solve the above Formula 47, more than one a priori condition (prerequisite) is necessary. The following three cases are possible:
(1) Case 1: Id=0→Ireflim=f($\omega$,Vmax)

This is the base speed range.
(2) Case 2: Id=Idmax→Ireflim=f($\omega$,Vmax,Imax)

In case 2, the limit current condition is "$i_{dmax}^2 + i_{reflim}^2 = I_{max}^2$".
(3) Case 3: Ireflim=Ireflim required by specifications→Id=f($\omega$,Vmax,Ireflim)

This is a case where the manufacturer (customer) requirement specifications are known. The limit value Iref_lim of the current command value is determined to meet the predetermined requirement specifications. The requirement specifications of the manufacturer (customer) usually contain a required rotational speed and torque. These are conditions made known in advance. Therefore, it is possible to store in a look-up table a predetermined limit value Iref_lim of the current command value that minimally meets the required output. The result of this calculation is available during an assist operation. Hence, no complicated calculations become unnecessary.

Descriptions will be given below of the foregoing Cases 1 to 3.

First the calculation of the limit value Ireflim of the current command value in the base speed range (Case 1) is explained. In the base speed range, a field-weakening control (Id≠0) is unnecessary. Therefore, substitution of "Id=0" into the above Formula 47 simplifies the calculation to obtain the above Formula 48 and to determine the limit value Ireflim of the current command value in the following Formula 49:

$$(\omega_e \cdot L \cdot Iref)^2 + (Iref \cdot R + \omega_e \cdot \psi)^2 = V_{max}^2 \quad \text{(Formula 48)}$$

$$I_{ref\,lim} = \left[ -\omega_e \cdot R \cdot \Psi + \sqrt{V_{max}^2 \cdot (R^2 + \omega_e^2 \cdot L^2) - \omega_e^4 \cdot L^2 \cdot \Psi^2} \right] \cdot \frac{1}{R^2 + \omega_e^2 \cdot L^2} \quad \text{(Formula 49)}$$

Next, an explanation will be given of the calculation of the limit value Ireflim of the current command value and the d-axis current command value Id in the high-speed ranges corresponding to Cases 2 and 3. In the high-speed ranges, a negative d-axis current command value (−Id) needs to be introduced to weaken the magnetic flux of the permanent magnet.

First, the maximum value solution for Case 2 is explained. The meaning of the maximum value solution is that the d-axis current command value Id always takes the maximum value when the angular speed $\omega$ of the motor is on or above base speed line $\omega_b$. This is because the maximum value current condition is used to calculate the d-axis current command value Id. Substitution of the above Formula 47 into Formula 50 which limits the current, and several subsequent modifications, yield Formula 51 below:

$$i_{dmax}^2 + i_{reflim}^2 = I_{max}^2 \quad \text{(Formula 50)}$$

$$I_d = A \cdot \left(\frac{1}{\omega_e}\right)^2 - \frac{R}{L} \cdot \frac{1}{\omega_e} \cdot I_{ref\,lim} - B \quad \text{(Formula 51)}$$

where coefficients A and B are given by Formulas 52 and 53 below:

$$A = \frac{(V_{max}^2 - I_{max}^2 \cdot R^2)}{2 \cdot \Psi \cdot L} \quad \text{(Formula 52)}$$

$$B = \frac{I_{max}^2 \cdot R^2 + \Psi^2}{2 \cdot \Psi \cdot L} \quad \text{(Formula 53)}$$

Solving the above Formulas 50 and 51 yields Formula 54 below:

(Formula 54)

$$I_{ref\,lim} = \frac{\frac{R}{L} \cdot \frac{1}{\omega_e} \cdot \left[ A \cdot \left(\frac{1}{\omega_e}\right)^2 - B \right] + \sqrt{I_{max}^2 \cdot \left[1 + \left(\frac{R}{L} \cdot \frac{1}{\omega_e}\right)^2\right] - \left[A \cdot \left(\frac{1}{\omega_e}\right)^2 - B - \frac{R}{L} \cdot \frac{1}{\omega_e}\right]^2}}{1 + \left(\frac{R}{L} \cdot \frac{1}{\omega_e}\right)^2}$$

The above Formula 54 is for the limit value of the current command value Iref in a case where the maximum value of the d-axis current command value Id is used. From Formula 50, the maximum d-axis current Idmax is given by Formula 55 below:

$$I_{d\,max} = \sqrt{I_{max}^2 - I_{reflim}^2} \quad \text{(Formula 55)}$$

The maximum d-axis current Idmax in the above Formula 55 is "Id<0" and therefore an absolute value.

Next, an explanation will be given of a case where the limit value Ireflim of the current command value meeting the requirement specifications corresponding to the foregoing Case 3 is determined.

In the foregoing maximum current solution, the d-axis current command value Id always takes the maximum value when the motor angular speed ω is equal to or over the base angular speed $\omega_b$. As explained earlier, the motor current also always takes the maximum value. The maximum current of the d-axis current command value Id results in an unwanted loss in the motor and the occurrence of undesirably loud noise based on the d-axis current command value Id. Such a large d-axis current command value Id is not necessary for individual cases, and the customer-specified requirements are known. In this case, it is clear that the d-axis current command value Id in a function of Ireflim=the customer-specified Ireflim is "Id=f(ω,Vmax,Ireflim)". This is the optimal value of the d-axis current command value Id corresponding to a specific steering assist current command value Iref.

Case 2 is a conventional technique for determining the d-axis current command value Id without having it exceed the maximum current in the above Formula 37. When the d-axis current is large, negative side effects such as reduced efficiency, vibration and noise occur. The field-weakening control is necessary to produce an output, but the d-axis current command value Id does not have to be a non-duty saturating maximum value. It is desirable that the d-axis current command value Id is a minimum value needed for producing the required output. A required output for an electric power steering system is a known design requirement and usually determined at the request of an automotive manufacturer (customer).

Figure 13:
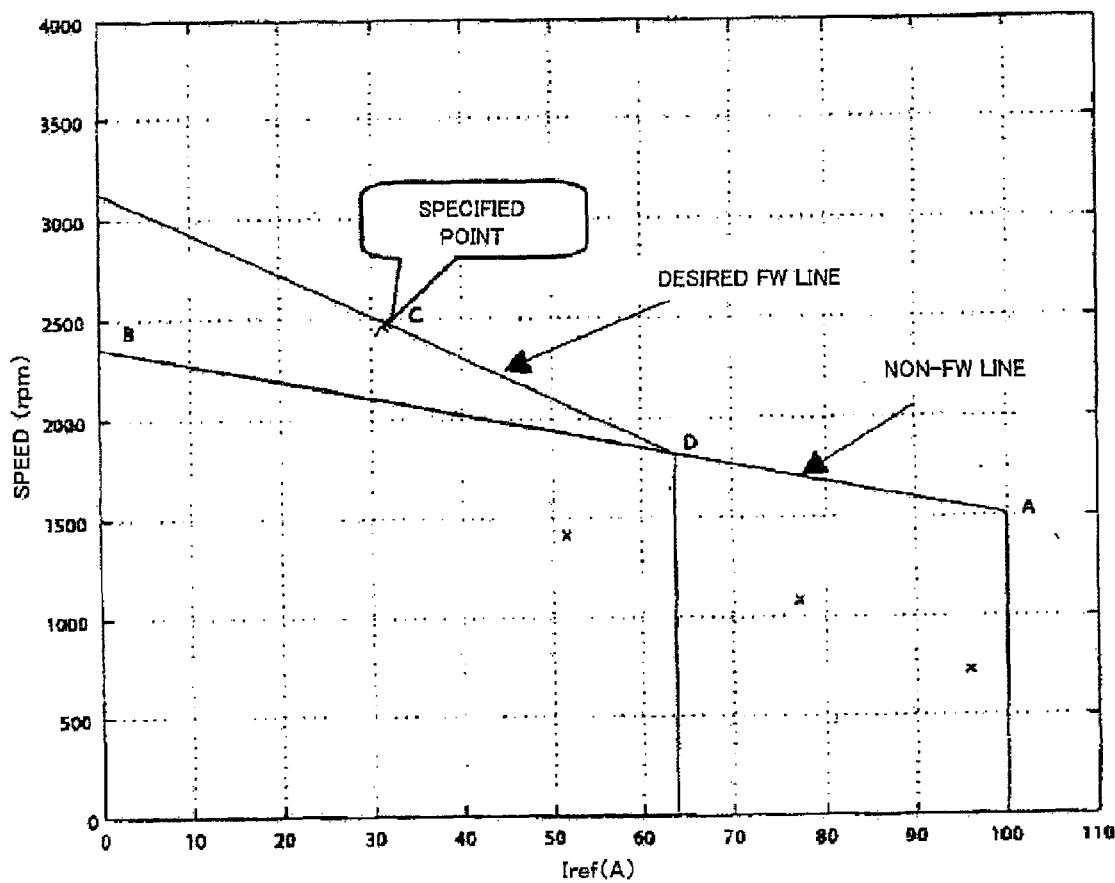
FIG. 13 is a graph showing a T-n characteristic of a motor and a preferred field-weakening control characteristic.

A point C in FIG. 13 represents a required output that cannot be produced without performing the field-weakening control. Therefore, the limit value of the d-axis current command value Id should be determined to yield the output represented by the point C. There is no need for producing an output which exceeds this value since doing so is not required. The d-axis current limit value thus obtained is the optimal value.

For example, when the customer specifications require four points A to D as shown in FIG. 13, a preferred field-weakening control line will be defined as a line CD. In FIG. 13, the point A is a rated point, the point B a no-load point, the point C a specified point (customer specified performance), the point D the start point of the field-weakening control (this point is optional, and the point D "IrefD" (=2×IrefC) having twice the magnitude of the point C is selected as an example for simplicity), a line AB is a non-field-weakening control line (Iref0_lim) and the line CD is a field-weakening control line.

Meanwhile, solution of the above Formula 47 with respect to the d-axis current command value Id yields Formula 56 below as an accurate solution:

$$I_d = \left[ -\omega_e \cdot L \cdot \Psi + \sqrt{\frac{(R^2 + \omega_e^2 \cdot L^2) \cdot [V_{max}^2 - I_{ref}^2 \cdot (R^2 + \omega_e^2 \cdot L^2)] -}{2 \cdot I_{ref} \cdot R \cdot \omega_e \cdot \Psi] - R^2 \cdot \omega_e^2 \cdot \Psi^2}} \right] \cdot \frac{1}{R^2 + \omega_e^2 \cdot L^2} \quad \text{(Formula 56)}$$

Formula 56 as a solution is based on the above Formula 47 for the maximum voltage condition. The d-axis current command value Id given by Formula 56 is further limited, using a limit current condition, as in Formula 57 below:

$$|I_d| \leq |I_{d\,max}| = \sqrt{I_{max}^2 - I_{reflim}^2} \quad \text{(Formula 57)}$$

The algorithm uses the above Formula 49 to calculate the limit value Ireflim of the current command value to obtain the line AB in FIG. 13, and uses the specifications of the point C to form the line CD. That is, "IrefD=2×IrefC".

(1) If Iref>Ireflim, $$Iref = I_{reflim}, Id = Id.$$

(2) If Iref≦Ireflim, $$Iref = I_{ref}, Id = Id.$$

Next, a description will be given below of the method for handling the change in the battery voltage Vdc.

If the q-axis current command value Iq and the d-axis current command value Id are held constant, the change amount ΔVdc of the battery voltage Vdc will be the change amount of the angular speed $\omega_e$. That is, the d-axis current limit value can be simplified as a function of the angular speed $\omega_e$ only. A function containing two variables, the battery voltage Vdc and the angular speed ω, would require such an accurate look-up table that it would use a large memory capacity. Hence, the ROM capacity would be used wastefully. Neither is supplementary use of a plurality of maps an option as with assist maps because it would result in a longer calculation time. Therefore, the present invention proposes to express the change in the battery voltage Vdc as a change in the angular speed ω in order to turn the d-axis current limit value into a function of the angular speed ω only.

If the voltage in the above Formula 25 is changed as in "V→V+ΔV" and the angular speed ω in the above Formula 26 is changed as in "ω→ω+Δω", Formulas 58 and 59 below will be obtained:

$$V_d + \Delta V_d = i_d \cdot R - (\omega_e + \Delta \omega_e) L d \cdot i_q \quad \text{(Formula 58)}$$

$$v_q + \Delta v_q = i_q \cdot R + (\omega_e + \Delta \omega_e) L q \cdot i_d + (\omega_e + \Delta \omega_e) \psi \quad \text{(Formula 59)}$$

Then, subtraction of the above Formula 25 from Formula 58, and the above Formula 25 from Formula 59, yields Formulas 60 and 61 below, respectively:

$$\Delta v_d = -\omega_e \cdot L d \cdot i_q \quad \text{(Formula 60)}$$

$$\Delta v_q = \Delta \omega_e \cdot L q \cdot i_d + \Delta \omega_e \cdot \psi \quad \text{(Formula 61)}$$

Formulas 60 and 61 are relations of the amount ΔV of the voltage change and the amount Δω of the angular speed. The d-axis current limit value approximation formula or supplementary calculation for the relation (look-up table) of the amount ΔV of the voltage change and the amount Δω of the angular speed is not needed. Thus, Formula 62 below holds:

$$\Delta v_d^2 + \Delta v_q^2 = \Delta V^2 \quad \text{(Formula 62)}$$

where $$\Delta v = (Vdc - Vdcn)/2 \quad \text{(Formula 63)}$$

$$\Delta V^2 = (\Delta\omega_e \cdot L \cdot I_q)^2 + (\Delta\omega \cdot L \cdot I_d + \Delta\omega_e \cdot \Psi)^2 = \Delta\omega_e^2 \cdot [L^2 \cdot (I_d^2 + I_q^2) + \Psi^2 + 2 \cdot L \cdot I_d \cdot \Psi]$$ (Formula 64)

$$\Delta\omega_e = \Delta V \cdot \frac{1}{\sqrt{L^2 \cdot (I_d^2 + I_q^2) + \Psi^2 + 2 \cdot L \cdot I_d \cdot \Psi}}.$$ (Formula 65)

Formula 65 means that the change of the change amount Δω is calculated with a look-up table and multiplied by the change amount ΔV.

Figure 14:
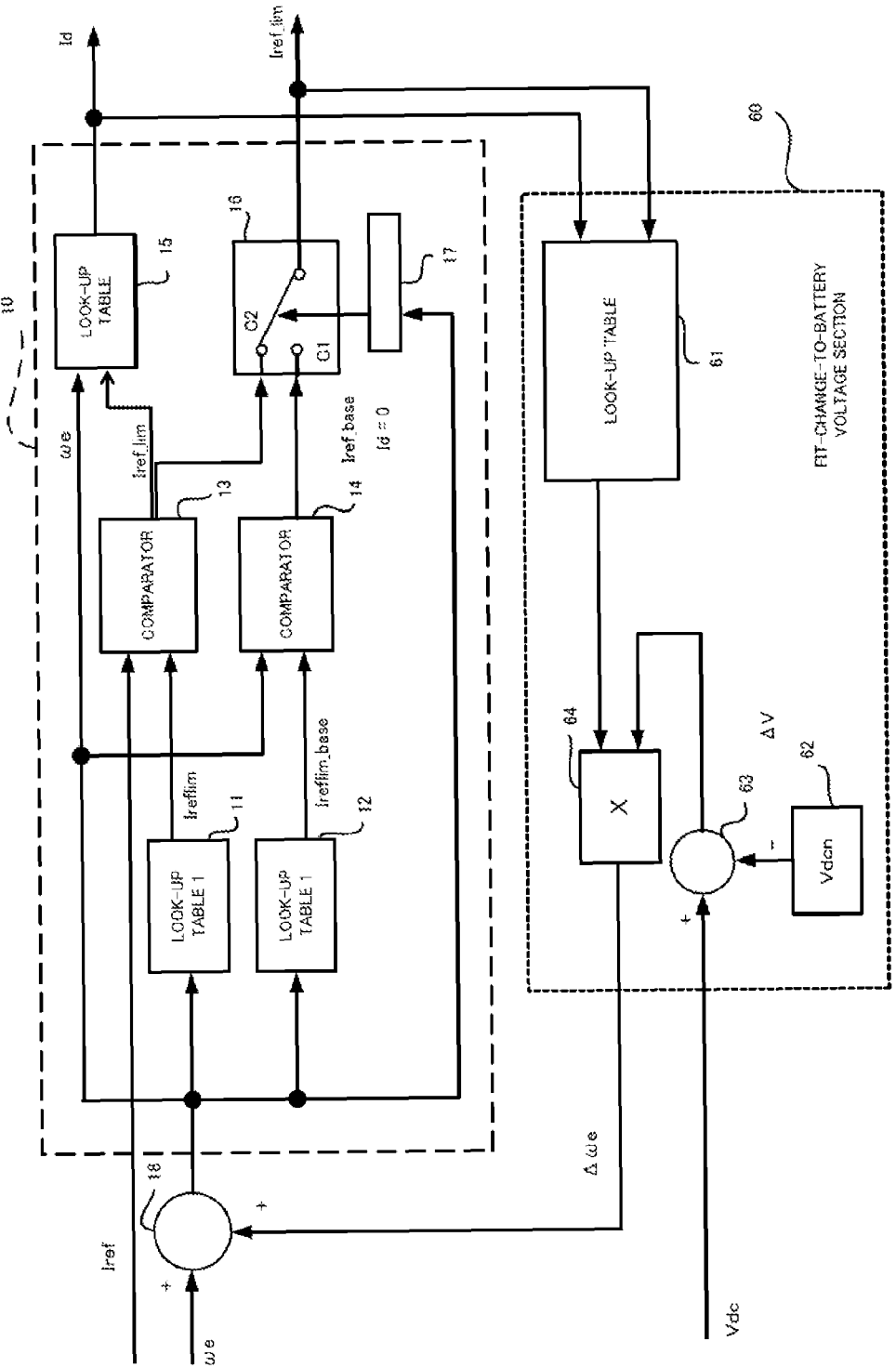
FIG. 14 is a block configuration diagram showing another preferred embodiment of the present invention.

The hardware implementation of the foregoing calculations is achieved by the configuration shown in FIG. 14. This configuration includes a fit-change-to-battery-voltage section 60 and an adder 18 in addition to the current command value calculator in FIG. 8. The fit-change-to-battery-voltage section 60 includes a setting section 62 outputting a parameter Vdcn, a subtractor 63 subtracting the parameter Vdcn from the battery voltage Vdc, a look-up table 61 receiving the d-axis current command value Id and the limit value Iref_lim of the current command value from the current command value calculator to output a best-fit value, and a multiplier 64 multiplying a voltage ΔV from the subtractor 63 with the best-fit value from the look-up table 61 to output the change amount $\Delta\omega_e$ of the angular speed. The look-up table 61 receives the d-axis current command value Id and the limit value Iref_lim of the current command value, both determined by the current command value calculator, while the subtractor 63 receives the battery voltage Vdc to determine the change amount ΔV (=Vdc−Vdcn). The change amount $\Delta\omega_e$ in the angular speed determined by the multiplier 64 is inputted to the adder 18. Its sum "$\omega_e + \Delta\omega_e$" with the angular speed $\omega_e$ is inputted to the current command value calculator.

Referring to a flow chart in FIG. 15, a description will be given below of a preferred sequence of operational steps with a configuration such as the one just described above.

First, the steering assist current command value calculator calculates a steering assist current command value Iref based on the steering torque and the vehicle speed (Step S20), and receives the angular speed $\omega_e$ of the motor 5 and an change amount $\Delta\omega_e$ of the angular speed from the fit-change-to-battery-voltage section 60 to calculate the change amount "$\omega_e + \Delta\omega_e$" (Step S21). The order of these steps is interchangeable.

Next, the look-up table 11 is used to determine the limit value Ireflim of the current command value based on the calculated change amount "$\omega_e + \Delta\omega_e$" (Step S22), and the look-up table 12 is used to determine the base limit value Iref_base of the current command value (Step S23). The limit value Ireflim of the current command value is inputted to the comparator 13, while the base limit value Iref_base of the current command value is inputted to the comparator 14. The order of calculation of the limit value Ireflim of the current command value and the base limit value Iref_base of the current command value is interchangeable.

The comparator 13 compares the steering assist current command value Iref and the limit value Ireflim of the current command value to calculate the limit value Iref_lim of the current command value (Step S24), while the comparator 14 compares the steering assist current command value Iref and the base limit value Ireflim_base of the current command value to calculate the limit value Iref_base of the current command value and the d-axis current command value "Id=0" (Step S25). The limit value Iref_lim of the current command value is inputted to the contact c2 of the switch 16, while the base limit value Ireflim_base of the current command value and the d-axis current command value "Id=0" are inputted to the contact c1 of the switch 16. The look-up table 15 is used to calculate the d-axis current command value Id based on the change amount "$\omega_e + \Delta\omega_e$" and the limit value Iref_lim of the current command value (Step S26).

Then, the detecting and switching unit 17 determines whether or not the change amount "$\omega_e + \Delta\omega_e$" is equal to or greater than the base angular speed $\omega_b$ (Step S30). If the change amount "$\omega_e + \Delta\omega_e$" is equal to or greater than the base angular speed $\omega_b$, the contact of the switch 16 will be switched over to the contact c1 to perform the field-weakening control (Step S31) and output the base limit value Iref_base of the current command value and the d-axis current command value "Id=0" from the comparator 14 as the limit value Iref_lim (Step S33). On the other hand, if the change amount "$\omega_e + \Delta\omega_e$" is less than the base angular speed $\omega_b$, the contact of the switch 16 will be switched over to the contact c2 (Step S32), and the limit value Ireflim_lim of the current command value from the comparator 13 will be outputted unchanged as the limit value Iref_lim of the current command value (Step S33).

The fit-change-to-battery-voltage section 60 receives the battery voltage Vdc (Step S34) to calculate the differential voltage Δv (=Vdcc−Vdcn) from the predetermined parameter Vdcn and inputs the differential voltage Δv to the multiplier 64 (Step S35). Meanwhile, the look-up table 61 receives the d-axis current command value Id and the limit value Iref_lim of the current command value from the current command value calculator 10 (Step S36). Based on the d-axis current command value Id and the limit value Iref_lim of the current command value, the look-up table 61 is used to calculate the best-fit value (Step S37) and input the best-fit value to the multiplier 64. Based on the best-fit value and the differential voltage ΔV, the multiplier 64 determines and inputs the change amount $\Delta\omega_e$ in the angular speed to the adder 18 (Step S38).

Industrial Applicability

According to the present invention, reduction of current errors caused by excessively high reference currents reduces operation noise and torque ripple in high-speed ranges. Moreover, accurate calculation of the limit value of a current command value prevents duty saturation. Consequently, it is possible to reduce the torque ripple caused by distorted motor current waveforms. Therefore, it is possible to provide an electric power steering system that is free from abnormal motor noise and gives a natural steering feel even during an abrupt turning-back operation of the steering wheel.

Moreover, a minimum current corresponding to a required load speed can be obtained by calculating a d-axis current command value Id based on a current Iref_lim required by the specifications. Thus, steering noise attributable to an excessively large d-axis current command value Id can be suppressed, thereby contributing to an energy-saving.

The invention claimed is:

1. A method for controlling an electric power steering system wherein a d-axis current command value Id and a q-axis current command value Iq are calculated based on a steering assist current command value Iref calculated from a steering torque, a motor is controlled by an inverter with a vector control based on the d-axis current command value Id and the q-axis current command value Iq and is driven to provide a steering assist power to a vehicle steering system, the method comprising:

carrying out a field-weakening control on a d-axis of the vector control in accordance with a following equation;

$Id = -|Iref| \cdot \sin(\cos^{-1}(\omega_b/\omega_e))$ where, $\omega_e$ is an angular speed of the motor and $\omega_b$ is a base angular speed, obtaining a first limit value of the steering assist current command value Iref and a first base limit value based on the angular speed $\omega_e$ and a rated output characteristic of the motor;

obtaining a second limit value of the steering assist current command value Iref based on the steering assist current command value Iref and the first limit value;

obtaining a second base limit value based on the steering assist current command value Iref and the first base limit value;

calculating the d-axis current command value Id based on the angular speed $\omega_e$ and the second limit value;

switching the second base limit value to an output when the angular speed $\omega_e$ is equal to or smaller than the base angular speed $\omega_b$, and the second limit value to an output when the angular speed $\omega_e$ exceeds the base angular speed $\omega_b$; and limiting the steering assist current command value Iref by the switching of the second base limit value and the second limit value.

2. A method for controlling an electric power steering system according to claim 1, wherein the calculations of the first limit value, the first base limit value and the d-axis current command value Id are respectively performed by formulas stored in look-up tables.

3. A method for controlling an electric power steering system according to claim 2, further comprising obtaining a change amount of the angular speed $\omega_e$ from the d-axis current command value Id, the limit value of the steering assist current command value Iref and a battery voltage, and correcting the angular speed $\omega_e$ by using the change amount.

4. A method for controlling an electric power steering system according claim 3, wherein the limit value of the steering assist current command value Iref is used to control every phase of the motor.

5. A method for controlling an electric power steering system according to claim 1, wherein the d-axis current command value Id during the field-weakening control is a minimum field-weakening current to achieve a desired motor torque-angular speed characteristic.

6. A method for controlling an electric power steering system according to claim 5, wherein the desired motor torque-angular speed characteristic is obtained from a battery voltage and a current of the inverter.

7. A method for controlling an electric power steering system according claim 1, wherein the limit value of the steering assist current command value Iref is used to control every phase of the motor.

8. A control apparatus for an electric power steering system, comprising a steering assist current command value calculator for calculating a steering assist current command value Iref based on a steering torque and a drive controller for controlling a drive of a permanent magnet type brushless DC-motor driven by a vector control of a d-axis current command value Id and a q-axis current command value Iq which are calculated from the steering assist current command value Iref, and providing a steering assist power by means of the permanent magnet type brushless DC-motor to a vehicle steering system, wherein:

the control apparatus carries out a field-weakening control on a d-axis of the vector control in accordance with a following equation;

$$Id = -|Iref| \cdot \sin(\cos^{-1}(\omega_b/\omega_e))$$

where, $\omega_e$ is an angular speed of the permanent magnet type brushless DC-motor and $\omega_b$ is a base angular speed, the control apparatus further comprises a current command value calculator to limit the steering assist current command value Iref based on a rated output characteristic of the permanent magnet type brushless DC-motor, the steering assist current command value Iref and the angular speed $\omega_e$ of the permanent magnet type brushless DC-motor;

the current command value calculator comprises a first look-up table for calculating a first limit value based on the angular speed $\omega_e$ to output the first limit value, a second look-up table for calculating a base limit value based on the angular speed $\omega_e$ to output the base limit value, a first comparator for comparing the steering assist current command value Iref and the first limit value to output a second limit value, a second comparator for comparing the steering assist current command value Iref and the base limit value to output a base command value, a third look-up table for calculating the d-axis current command value Id based on the angular speed $\omega_e$ and the second limit value to output the d-axis current command value Id, a switch unit to switch the second limit value and the base command value to output the second limit value or the base command value, and a detecting and switching unit for detecting the angular speed $\omega_e$ and outputting a limit value of the steering assist current command value Iref; and the control apparatus outputs the limit value of the steering assist current command value Iref and the d-axis current command value Id during the field-weakening control and non-field-weakening control of the d-axis.

9. A control apparatus for an electric power steering system according to claim 8, wherein the rated output characteristic is obtained from a battery voltage and a current of an inverter in the drive controller.

10. A control apparatus for an electric power steering system according to claim 8, further comprising a fit-change-to-battery-voltage section for inputting the d-axis current command value Id and the limit value of the steering assist current command value Iref and for calculating a change amount in angular speed by inputting the battery voltage, and an adder adding the angular speed $\omega_e$ and the change amount in angular speed and inputting a sum to the current command value calculator, wherein, the control apparatus outputs the limit value of the steering assist current command value Iref and the d-axis current command value Id which is corrected by the battery voltage during the field-weakening control and a non-field-weakening control of the d-axis.

11. A control apparatus for an electric power steering system according to claim 10, wherein the fit-change-to-battery-voltage section comprising a fourth look-up table for inputting the d-axis current command value Id and the limit value of the steering assist current command value Iref to output a best-fit value, and a multiplier multiplying the battery voltage and the best-fit value, thereby to output the change amount from the multiplier.

12. A control apparatus for an electric power steering system according to claim 11, wherein the battery voltage is corrected by parameters.

* * * * *